(12) United States Patent
Crossley et al.

(10) Patent No.: US 12,506,356 B2
(45) Date of Patent: Dec. 23, 2025

(54) POWER GENERATION SYSTEM

(71) Applicant: GeoPura Ltd, Wysall (GB)

(72) Inventors: Richard Crossley, Nottingham (GB); Andrew Cunningham, Nottingham (GB); Theo Elmer, Sheffield (GB); Thomas Robinson, Rossendale (GB); Jeremy Stratford, Wirksworth (GB)

(73) Assignee: GeoPura Ltd, Wysall (GB)

( * ) Notice: Subject to any disclaimer, the term of this patent is extended or adjusted under 35 U.S.C. 154(b) by 0 days.

(21) Appl. No.: 18/564,373

(22) PCT Filed: May 28, 2021

(86) PCT No.: PCT/GB2021/051319
§ 371 (c)(1),
(2) Date: Nov. 27, 2023

(87) PCT Pub. No.: WO2022/248818
PCT Pub. Date: Dec. 1, 2022

(65) Prior Publication Data
US 2024/0266865 A1    Aug. 8, 2024

(51) Int. Cl.
*H02J 9/06* (2006.01)
*H02J 7/00* (2006.01)

(52) U.S. Cl.
CPC ............ *H02J 9/062* (2013.01); *H02J 7/0063* (2013.01)

(58) Field of Classification Search
CPC .............................. H02J 9/062; H02J 7/0063
(Continued)

(56) References Cited

U.S. PATENT DOCUMENTS

| 2011/0278932 A1 | 11/2011 | Navarro et al. |
| 2014/0152097 A1 | 6/2014 | Kitaji |
| 2021/0249894 A1* | 8/2021 | Panfil ................... H02J 7/0068 |

FOREIGN PATENT DOCUMENTS

| JP | 2011517266 A | 5/2011 |
| JP | 2014068504 A | 4/2014 |

(Continued)

OTHER PUBLICATIONS

International Search Report and the Written Opinion of the International Searching Authority, PCT Application No. PCT/GB2021/051319, pp. 1-6, dated May 4, 2022.
(Continued)

*Primary Examiner* — Michael R. Fin
(74) *Attorney, Agent, or Firm* — Bond, Schoeneck & King, PLLC

(57) ABSTRACT

A controller for a power generation system, wherein the power generation system comprises: a power outlet, a fuel cell that is configured to selectively provide power for the power outlet; a battery that is configured to selectively provide power for the power outlet; and an inverter for converting a DC voltage that is provided by the fuel cell into an inverter-AC-voltage for providing to the power outlet. The controller is configured to: receive a system-load-signal that represents the amount of power that is required by an external load that is connected to the power outlet; receive one or more fuel-cell-parameters that represent one or more operating parameters of the fuel cell; and provide a fuel-cell-power-control-signal based on the system-load-signal and the one or more fuel-cell-parameters, wherein the fuel-cell-power-control-signal is for setting a control-parameter of the fuel cell and/or is for setting a control parameter of the inverter.

12 Claims, 11 Drawing Sheets

(58) Field of Classification Search
USPC .......................................................... 307/66
IPC .......................................... H02J 9/062, 7/0063
See application file for complete search history.

(56) References Cited

FOREIGN PATENT DOCUMENTS

| JP | 2014165955 A | 9/2014 |
| JP | 2015211507 A | 11/2015 |
| JP | 2016092849 A | 5/2016 |
| JP | 2019501622 A | 1/2019 |
| WO | 2013015374 A1 | 1/2013 |

OTHER PUBLICATIONS

Jafari Mohammad et al: "Development of a Fuzzy-Logic-Based Energy Management System for a Multiport Multioperation Mode Residential Smart Microgrid", IEEE Transactions on Power Electronics, Institute of Electrical and Electronics Engineers, USA, vol. 34, No. 4, Apr. 1, 2019 (Apr. 1, 2019), pp. 3283-3301, XP011714132, ISSN: 0885-8993, DOI: 10.1109/TPEL.2018.2850852.
Garcia Pablo et al: "ANFIS-Based Control of a Grid-Connected Hybrid System Integrating Renewable Energies, Hydrogen and Batteries", IEEE Transactions on Industrial Informatics, IEEE Service Center, New York, NY, US, vol. 10, No. 2, May 1, 2014 (May 1, 2014), pp. 1107-1117, XP011547214, ISSN: 1551-3203, DOI: 10.1109/TII.2013.2290069.
Notice of Reasons for Refusal, JP Patent Application No. 2023-573368, dated Jun. 13, 2025, pp. 1-17 (with pp. 1-8 being a translation).
Notice of Reasons for Refusal, JP Patent Application No. 2023-573368, dated Jun. 24, 2025, pp. 1-17 (with pp. 1-8 being a translation).
Communication Pursuant To Article 94(3) EPC, EP Patent Application No. 21737119.4, dated Oct. 27, 2025, pp. 1-9.

* cited by examiner

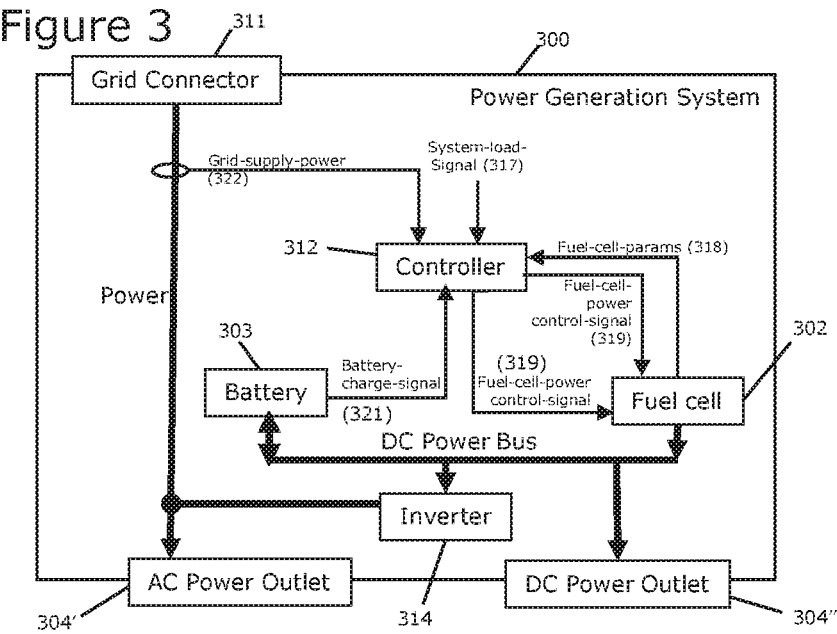
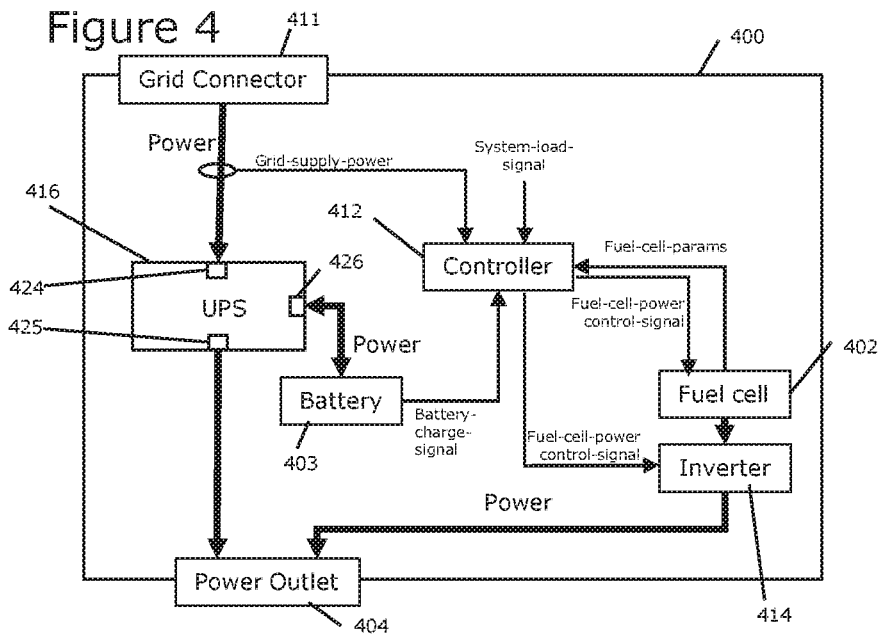

POWER GENERATION SYSTEM

CROSS-REFERENCE TO RELATED APPLICATIONS

The present application is a United States National Stage Application pursuant to 35 U.S.C. § 371 of International Patent Application No. PCT/GB2021/051319, filed May 28, 2021, and entitled, "A Power Generation System," the entire disclosure of which is hereby incorporated by reference in its entirety.

FIELD

The present disclosure relates to a power generation system, and in particular to a power generation system that uses a fuel cell to supplement or replace a grid/shore supply.

SUMMARY

According to a first aspect of the present disclosure there is provided a controller for a power generation system, wherein the power generation system comprises:
a power outlet,
a fuel cell that is configured to selectively provide power for the power outlet;
a battery that is configured to selectively provide power for the power outlet; and
an inverter for converting a DC voltage that is provided by the fuel cell into an inverter-AC-voltage for providing to the power outlet;
wherein the controller is configured to:
receive a system-load-signal that represents the amount of power that is required by an external load that is connected to the power outlet;
receive one or more fuel-cell-parameters that represent one or more operating parameters of the fuel cell; and
provide a fuel-cell-power-control-signal based on the system-load-signal and the one or more fuel-cell-parameters, wherein the fuel-cell-power-control-signal is for setting a control-parameter of the fuel cell and/or is for setting a control parameter of the inverter.

The controller may be further configured to:
receive a battery-charge-signal that represents a level of charge of the battery; and
provide the fuel-cell-power-control-signal also based on the battery-charge-signal.

The controller may be configured to:
determine a fuel-cell-target-value based on the system-load-signal and the battery-charge-signal, wherein the fuel-cell-target-current represents a target level for the fuel cell; and
set the fuel-cell-power-control-signal based on the fuel-cell-target-value.

The fuel cell may be configured to provide power for the power outlet and also charge the battery.

The power generation system may further include:
a grid-supply-connector for receiving a grid supply power;
wherein the controller is further configured to:
receive a grid-supply-signal that represents a power level of the grid supply; and
determine the fuel-cell-target-level also based on the grid-supply-signal.

The power generation system may further include:
a grid-supply-connector for receiving a grid supply power;
wherein the controller is further configured to:
receive a grid-supply-characteristic-signal that represents a characteristic of the grid supply; and
provide the fuel-cell-power-control-signal also based on the grid-supply-characteristic-signal.

The grid-supply-characteristic-signal may comprise a grid-supply-power-level that represents a power level of the grid supply. The controller may be configured to:
determine a supply-threshold based on the system-load-signal;
compare the grid-supply-power-level with the supply-threshold; and
the fuel-cell-power-control-signal such that the fuel cell provides power for the power outlet; or
if the grid-supply-voltage-level is greater than or equal to the supply-threshold, then set the fuel-cell-power-control-signal such that the fuel cell does not provide power for the power outlet.

The controller may be configured to:
determine a fuel-cell-target-current based on the difference between the grid-supply-power-level and the supply-threshold; and
if the grid-supply-power-level is less than the supply-threshold, then set the fuel-cell-power-control-signal based on the fuel-cell-target-current.

There is also disclosed a power generation system comprising:
any controller disclosed herein;
a power outlet
a fuel cell;
a grid-supply-connector for receiving a grid supply voltage;
an uninterruptable power supply, UPS, that has: a grid-input terminal, a power-output-terminal and a battery-connection-terminal, wherein:
the grid-input terminal is connected to the grid-supply-connector,
the power-output-terminal is connected to the power outlet; and
the battery-connection-terminal is connected to the battery.

The fuel cell may be configured to provide power to the power outlet.

The fuel cell may be configured to provide power to charge the battery.

The power generation system may further comprise a DC-DC converter that is connected between the fuel cell and the battery.

According to a further aspect, there is provided a power generation system comprising:
a power outlet;
a fuel cell that is configured to selectively provide power for the power outlet;
a battery;
a grid-supply-connector for receiving a grid supply power;
an uninterruptable power supply, UPS, that has: a grid-input terminal, a power-output-terminal and a battery-connection-terminal, wherein:
the grid-input terminal is connected to the grid-supply-connector,
the power-output-terminal is connected to the power outlet;
the battery-connection-terminal is connected to the battery; and the UPS is configured to provide power that it receives at the grid-input terminal and/or the battery-connection-terminal to the power-output-terminal;

wherein the UPS is configured to provide power that it receives at the grid-input terminal to the battery-connection-terminal in order to charge the battery.

The power generation system may further comprise:

an inverter configured to convert a DC output voltage provided by the fuel cell into an inverter-AC-voltage, and wherein the inverter is configured to provide the inverter-AC voltage to the power outlet.

The fuel cell may be configured to provide power to charge the battery.

According to a further aspect, there is provided a power generation system comprising:

a power outlet;
an inverter configured to convert a DC output voltage into an inverter-AC-voltage, and wherein the inverter is configured to provide the inverter-AC voltage to the power outlet;
a battery;
a grid-supply-connector for receiving a grid supply voltage;
an uninterruptable power supply, UPS, that has: a grid-input terminal, a power-output-terminal and a battery-connection-terminal, wherein:
 the grid-input terminal is connected to the grid-supply-connector;
 the power-output-terminal is connected to the power outlet; and
 the battery-connection-terminal is connected to the battery; and
a controller that is configured to:
 receive a grid-supply-characteristic-signal that represents a characteristic level of the grid supply voltage;
 provide an inverter-control-signal to the inverter based on the grid-supply-characteristic-signal, wherein the inverter-control-signal is for setting or limiting the inverter power output supplied.

The power generation system may further comprise:
a fuel cell configured to provide a DC output voltage; and wherein the inverter is configured to convert the DC output voltage provided by the fuel cell into the inverter-AC-voltage.

The power generation system may further comprise:
a recirculation-switch that is configured to selectively connect the power-output-terminal of the UPS to the grid-input terminal of the UPS.

The controller may be configured to operate the recirculation-switch based on the grid-supply-characteristic-signal.

The controller may be configured to operate the recirculation-switch such that it connects the power-output-terminal to the grid-input terminal of the UPS.

The power generation system may further comprise:
a grid-isolation-switch that is configured to selectively disconnect the grid-input terminal of the UPS from the grid-supply-connector.

The controller may be configured to operate the grid-isolation-switch based on the grid-supply-characteristic-signal.

The controller may be configured to operate the grid-isolation-switch such that it disconnects the grid-input terminal of the UPS from the grid-supply-connector if the grid-supply-characteristic-signal does not meet a grid-supply-quality threshold.

The controller may be configured to:
set the grid-isolation-switch such that it disconnects the grid-input terminal of the UPS from the grid-supply-connector before it sets the recirculation-switch such that it connects the power-output-terminal of the UPS to the grid-input terminal of the UPS.

The controller may be configured to:
apply a minimum time delay between setting the grid-isolation-switch such that it disconnects the grid-input terminal of the UPS from the grid-supply-connector and setting the recirculation-switch such that it connects the power-output-terminal of the UPS to the grid-input terminal of the UPS.

The recirculation-switch may be configured to selectively connect a protected earth terminal of the power-output-terminal to a neutral terminal and optionally one or more localised earth rods, or similar earthing arrangements.

The protected earth terminal of the power-output-terminal may be selectively connected to a protected earth terminal of the grid-input terminal.

According to a further aspect, there is provided an inverter circuit comprising:

a DC-input-terminal and a reference-terminal, across which a DC voltage signal is provided when in use;
a plurality of inverters, each inverter comprising: a first-inverter-input-terminal; and a second-inverter-input-terminal;
a plurality of diodes, one for each of the plurality of inverters;
wherein:
 the first-inverter-input-terminal of each of the plurality of inverters is connected to the DC-input-terminal;
 the second-inverter-input-terminal of each of the plurality of inverters is connected to the reference-terminal through a respective one of the plurality of diodes such that current is inhibited from flowing from the reference-terminal to the second-inverter-input-terminal.

Each of the plurality of inverters can convert a DC voltage received across the first-inverter-input-terminal and the second-inverter-input-terminal in order to provide an AC voltage output.

The inverter circuit may further comprise: a plurality of capacitors, one for each of the plurality of inverters. Each of the plurality of capacitors may be connected between the first-inverter-input-terminal and the second-inverter-input-terminal of a respective one of the plurality of the inverters.

The inverter circuit may further comprise: a plurality of first-inverter-input-ferrites, one for each of the plurality of inverters; and a plurality of second-inverter-input-ferrites, one for each of the plurality of inverters. Each of the plurality of first-inverter-input-ferrites may be connected in series between the first-inverter-input-terminal of a respective one of the plurality of the inverters and the DC-input-terminal. Each of the plurality of second-inverter-input-ferrites may be connected in series between the second-inverter-input-terminal of a respective one of the plurality of the inverters and the reference-terminal.

The inverter circuit may further comprise: a plurality of first-inverter-input-ferrites, one for each of the plurality of inverters; a plurality of second-inverter-input-ferrites, one for each of the plurality of inverters; a plurality of DC-input-ferrites, one for each of the plurality of inverters; a plurality of reference-input-ferrites, one for each of the plurality of inverters. For each of the inverters: a respective one of the first-inverter-input-ferrites may be connected in series between the first-inverter-input-terminal and a first node; a respective one of the DC-input-ferrites may be connected in series between the first node and the DC-input-terminal; a respective one of the second-inverter-input-ferrites may be connected in series between the second-inverter-input-terminal and a second node; a respective one of the reference-input-ferrites may be connected in series between the second node and an anode of a respective one of the diodes; a cathode of the respective one of the diodes may be connected to the reference-terminal; and a respective one of the capacitors may be connected between the first node and the second node.

According to a further aspect, there is provided a circuit for a power generation system, wherein the circuit comprises:
- an earth-output-terminal and three live-output-terminals;
- a ground-terminal;
- an inverter that is configured to convert a DC voltage that is provided by fuel cell into an inverter-AC-voltage, wherein the inverter comprises an inverter-neutral-output-terminal and three inverter-live-output-terminals; and
- a galvanic-isolation-circuit, wherein:
  - the galvanic-isolation-circuit comprises an isolation-transformer that includes:
    - three primary windings, each connected between a respective one of the three inverter-live-output-terminals and the inverter-neutral-output-terminal;
    - three secondary windings, each connected between a different pair of the three live-output-terminals; and
  - the galvanic-isolation-circuit provides a connection between the earth-output-terminal and the ground-terminal;
  - the galvanic-isolation-circuit includes an isolation-resistor and an isolation-capacitor that are connected in parallel with each other between the inverter-neutral-output-terminal and the ground-terminal.

The isolation-resistor and the isolation-capacitor may provide a high impedance connection to ground for the inverter.

The values of the isolation-resistor and the isolation-capacitor are such that current to ground for a given operating voltage is below a current-threshold.

According to a further aspect, there is provided a power generation system comprising:
- a power outlet;
- a fuel cell that is configured to selectively provide power for the power outlet;
- a galvanic-isolation-circuit that is configured to:
  - transfer power between the fuel cell and the power outlet (directly or indirectly via the battery), and
  - provide galvanic isolation between the fuel cell and the power outlet;
- a controller configured to:
  - receive a resistance-signal that represents the resistance between a power-transfer-node and earth, wherein the power-transfer-node is a node in the power transfer path between, and including, the fuel cell and the isolation-circuit; and
  - if the received resistance-signal is less than a resistance-threshold then perform one or more safety-operations.

The one or more safety-operations may comprise:
shutting down the fuel cell;
ceasing supply of hydrogen fuel to the fuel cell;
disconnecting the fuel cell from the galvanic-isolation-circuit;
disconnecting the fuel cell from the power outlet; and
isolating the power outlet such that it does not receive power from the power generation system.

The power generation system may comprise a grid-supply-connector for receiving a grid supply voltage. The one or more safety-operations may comprise isolating the grid-supply-connector such that it does not provide power to the power generation system.

The power generation system may comprise an uninterruptable power supply, UPS. The one or more safety-operations may comprise disconnecting the UPS from the power outlet.

The one or more safety-operations may comprise ceasing supply of hydrogen fuel to the fuel cell by closing a shut-off valve that is in a fuel flow path between a hydrogen supply and the fuel cell.

The shut-off valve may be a normally closed valve.

The controller may be configured to:
if the received resistance-signal returns to being greater than a reconnect-resistance-threshold, after being less than the resistance-threshold, then perform one or more reconnection-operations.

The one or more reconnection-operations may comprise:
restarting the fuel cell;
recommencing supply of hydrogen fuel to the fuel cell;
reconnecting the fuel cell to the galvanic-isolation-circuit;
reconnecting the fuel cell to the power outlet; and
reconnecting the power outlet such that it does receive power from the power generation system.

The power generation system may comprise a grid-supply-connector for receiving a grid supply voltage. The one or more reconnection-operations may comprise reconnecting the grid-supply-connector such that it does provide power to the power generation system.

The power generation system may comprise an uninterruptable power supply, UPS. The one or more reconnection-operations may comprise reconnecting the UPS to the power outlet.

According to a further aspect, there is provided a power generation system comprising:
- a power outlet;
- a fuel cell that is configured to selectively provide power for the power outlet;
- a battery that is configured to selectively provide power for the power outlet;
- a grid-supply-connector for receiving a grid supply voltage;
- an uninterruptable power supply, UPS, that has: a grid-input terminal, a power-output-terminal and a battery-connection-terminal, wherein:
  - the grid-input terminal is connected to the grid-supply-connector,
  - the power-output-terminal is connected to the power outlet; and
  - the battery-connection-terminal is connected to the battery; and a controller configured to:
  - perform one or more safety-operations in response to receiving an alarm-trigger-signal.

The controller may be configured to, as a safety-operation:
provide a fuel-cell-power-control-signal for reducing the power that is provided by the fuel cell.

The controller may be configured to provide a fuel-cell-power-control-signal for reducing the power that is provided by the fuel cell down to zero.

The controller may be configured to provide a fuel-cell-power-control-signal for gradually reducing the power that is provided by the fuel cell.

The power generation system may comprise a shut-off valve for ceasing supply of hydrogen fuel to the fuel cell. The controller may be configured to, as a safety-operation: cause the shut-off valve to cease supply of hydrogen fuel to the fuel cell.

The shut-off valve may be a normally closed valve.

The power generation system may comprise a galvanic-isolation-circuit that is configured to: transfer power between the fuel cell and the power outlet, and provide galvanic isolation between the fuel cell and the power outlet. The controller is configured to, as a safety-operation: disconnect the fuel cell from the galvanic-isolation-circuit.

The power generation system may comprise a fuel-cell-isolation-switch for selectively connecting/disconnecting the fuel cell to/from the power outlet.

The controller may be configured to, as a safety-operation: operate the fuel-cell-isolation-switch in order to disconnect the fuel cell from the power outlet.

The power generation system may comprise a power-outlet-isolation-switch for selectively connecting/disconnecting the power outlet from the UPS and/or the fuel cell. The controller may be configured to, as a safety-operation: operate the power-outlet-isolation-switch such that the power outlet does not receive power from the power generation system.

The power generation system may comprise a grid-isolation-switch for selectively connecting/disconnecting the grid-supply-connector to/from the UPS. The controller may be configured to, as a safety-operation: operate the grid-isolation-switch such that the UPS does not receive power from the grid-supply-connector.

The controller may comprise one or more relays that are configured to perform one or more of the safety-operations. The one or more relays may be hard-wired to one or more actuators that are configured to implement safety-operations. The one or more actuators may comprise: a shut-off valve; a fuel-cell-isolation-switch; a power-outlet-isolation-switch; and a grid-isolation-switch.

The power generation system may further comprise a user interface that is operable by a user to provide the alarm-trigger-signal to the controller.

The user interface may comprise an emergency stop button that is remote from the power generation system; and/or the user interface may comprise an emergency stop button that is local to the power generation system; and/or the user interface may be configured to wirelessly provide the alarm-trigger-signal to the controller.

The power generation system may comprise a shipping container, which houses the fuel cell, the battery and the UPS. The user interface may comprise one or both of: an emergency stop button inside the shipping container; and an emergency stop button outside the shipping container.

The power generation system may further comprise a sensor that is configured to provide the alarm-trigger-signal. The sensor may comprise one or more of:
 a smoke sensor associated with the power generation system;
 a heat sensor associated with the power generation system;
 a gas sensor associated with the power generation system; and
 an airflow sensor for sensing airflow in a fuel cell compartment of the power generation system.

The controller may be configured to:
 receive one or more system-parameters that represent one or more operating parameters of the power generation system; and
 generate the alarm-trigger-signal based on the one or more system-parameters.

The one or more operating parameters of the power generation system may comprise one or more fuel-cell-parameters that represent one or more operating parameters of the fuel cell.

According to a further aspect, there is provided a power generation system comprising:
 a container (optionally a shipping container) having an interior volume;
 a fuel cell compartment, which is a portion of the interior volume that is defined by one or more fuel-cell-partitions in the container;
 a fuel cell located within the fuel cell compartment;
 a battery compartment, which is a portion of the interior volume that is defined by one or more battery-partitions;
 a battery located within the battery compartment;
 a control compartment, which is a portion of the interior volume that is:
  separated from the fuel cell compartment by the one or more fuel-cell-partitions;
  separated from the battery compartment by the one or more battery-partitions;
 an outflow vent; and
 a fan configured to reduce the air pressure in the fuel cell compartment such that air is drawn through the battery compartment and the fuel cell compartment and exits the container through the outflow vent.

The outflow vent may be in an external wall of the container. The outflow vent may be in an external wall of the container that defines a wall of the fuel cell compartment.

The power generation system may further comprise: an inflow vent in an external wall of the container. The fan may be configured to draw air into the battery compartment and the fuel cell compartment from outside the container through the inflow vent.

The one or more battery-partitions may comprise a raised-floor-battery-partition that is generally parallel with, and spaced apart from, a bottom wall of the container, such that the battery compartment is defined between the raised-floor-battery-partition and the bottom wall of the container.

The inflow vent may be in an external wall that defines the battery compartment.

The one or more fuel-cell-partitions may comprise an internal-wall-partition that is generally parallel with, and spaced apart from, a side wall of the container, such that the fuel cell compartment is defined between the internal-wall-partition and the side wall of the container.

The outflow vent may be in an external wall that defines the fuel cell compartment.

The outflow vent may be in an upper region of the external wall, optionally proximal to the ceiling.

The fan may be configured to blow air out of the container through the outflow vent, thereby reducing the air pressure in the fuel cell compartment and the battery compartment.

The one or more battery-partitions may comprise a raised-floor-battery-partition that is generally parallel with, and spaced apart from, a bottom wall of the container, such that the battery compartment is defined between the raised-floor-battery-partition and the bottom wall of the container. The one or more fuel-cell-partitions may comprise an internal-wall-partition that is generally parallel with, and spaced apart from, a first side wall of the container, such that the fuel cell compartment is defined between the internal-wall-partition and the side wall of the container. The container may comprise a ceiling; and the internal-wall-partition may extend between the ceiling and the raised-floor-battery-partition.

The raised-floor-battery-partition may extend between a second side wall, that is opposite the first side wall, and the internal-wall-partition.

The control compartment may house one or more of:
a UPS;
a controller;
one or more relays;
one or more switches;
a galvanic-isolation-circuit;
an inverter;
a smoke sensor/alarm;
a heat sensor/alarm;
a gas sensor/alarm; and
an oxygen monitoring system.

The power generation system may further comprise:
an internal-partition that partially defines the fuel cell compartment and also partially defines the battery compartment; and
an internal vent in the internal-partition such that air can flow between the battery compartment and the fuel cell compartment.

The internal-partition may be in the same plane as the raised-floor-battery-partition.

According to a further aspect, there is provided a power generation system comprising:
a container;
a fuel cell within the container;
a hydrogen flow control valve that is in a conduit between a hydrogen supply that is outside the container, and the fuel cell (which can be for reducing the pressure of the hydrogen before it is provided to the fuel cell); and
an inert gas control system that is configured to operate the hydrogen flow control valve.

The hydrogen flow control valve may be outside the container.

The hydrogen flow control valve may be a normally closed valve.

According to a further aspect, there is provided a power generation system comprising:
a container (optionally a shipping container);
a control compartment, which is a portion of an interior volume of the container,
a fuel cell compartment, which is within the footprint of the container, and is separated from the control compartment by one or more gas-tight fuel-cell-partitions;
a fuel cell located within the fuel cell compartment;
a battery compartment, which is a portion of the interior volume of the container that is defined by one or more battery-partitions;
a battery located within the battery compartment; and
a fan configured to draw air into the fuel cell compartment from the battery compartment.

The fuel cell compartment may be open to atmosphere.

The fan may be configured reduce the pressure in the battery compartment.

The power generation system may further comprise an internal-partition that partially defines the fuel cell compartment and also partially defines the battery compartment. The fan may be located in the internal-partition.

The internal-partition may be in the same plane as one of the gas-tight fuel-cell-partitions.

The power generation system may further comprise an outflow vent in an external wall of the container that defines the fuel cell compartment. The outflow vent may be at an uppermost region of the fuel cell compartment.

The power generation system may further comprise a ceiling within the fuel cell compartment that is angled such that it defines a surface that extends upwards towards the outflow vent.

The power generation system may further comprise:
a hydrogen flow control valve that is in a conduit between a hydrogen supply and the fuel cell (optionally for reducing the pressure of the hydrogen before it is provided to the fuel cell); and
an inert gas control system that is configured to operate the hydrogen flow control valve.

The hydrogen flow control valve may be within the footprint of the container.

The hydrogen flow control valve may be a normally closed valve.

The power generation system may further comprise: an inflow vent in an external wall of the container. The fan may be configured to draw air into the battery compartment from outside the container through the inflow vent.

The one or more battery-partitions may comprise a raised-floor-battery-partition that is generally parallel with, and spaced apart from, a bottom wall of the container, such that the battery compartment is defined between the raised-floor-battery-partition and a bottom wall of the container.

The inflow vent may be in an external wall that defines the battery compartment.

The one or more gas-tight fuel-cell-partitions may comprise a gas-tight internal-wall-partition that is generally parallel with, and spaced apart from, a second side wall of the container, such that the control compartment is defined between the internal-wall-partition and the second side wall of the container.

The one or more battery-partitions may comprise a raised-floor-battery-partition that is generally parallel with, and spaced apart from, a bottom wall of the container, such that the battery compartment is defined between the raised-floor-battery-partition and the bottom wall of the container. The one or more gas-tight fuel-cell-partitions may comprise a gas-tight internal-wall-partition that is generally parallel with, and spaced apart from, a second side wall of the container, such that the control compartment is defined between the gas-tight internal-wall-partition and the second side wall of the container. The container may comprise a ceiling. The gas-tight internal-wall-partition may extend between the ceiling and the raised-floor-battery-partition.

The raised-floor-battery-partition may extend between the second side wall and the internal-wall-partition.

The control compartment may house one or more of: a UPS; a controller; one or more relays; one or more switches; a galvanic-isolation-circuit; an inverter; a smoke sensor/alarm; a heat sensor/alarm; a gas sensor/alarm; and an oxygen monitoring system.

According to a further aspect, there is provided a power generation system comprising:
a container (optionally a shipping container) having an interior volume;
a fuel cell compartment, which is a portion of the interior volume that is defined by one or more fuel-cell-partitions in the container;
a fuel cell located within the fuel cell compartment;
a battery compartment, which is a portion of the interior volume that is defined by one or more battery-partitions;
a battery located within the battery compartment;

a control compartment, which is a portion of the interior volume that is:
   separated from the fuel cell compartment by the one or more fuel-cell-partitions; and
   separated from the battery compartment by the one or more battery-partitions; and
one or more rupture panels in an exterior wall or ceiling of the container.

The rupture panels may be configured to be removable from respective frames in the exterior wall or ceiling of the container in response to a rapid increase in air pressure within the container.

At least one of the rupture panels may be located in an exterior wall or ceiling of the container that defines the fuel cell compartment.

At least one of the rupture panels may be located in an exterior wall or ceiling of the container that defines the control compartment.

At least one of the rupture panels may be located in the ceiling of the container.

At least one of the rupture panels may have one edge that is more securely affixed to the container than other edges of the rupture panel.

According to a further aspect, there is provided a power generation system comprising:
a container (optionally a shipping container);
a fuel cell located within the container;
a fuel cell cooling loop for removing heat from the fuel cell; and
a heat exchanger for transferring heat from the fuel cell cooling loop such that it can be used to service a local application that requires heat.

The local application may comprise one or more of: providing a hot water supply; providing space heating; and providing heating for one or more processes.

The power generation system may further comprise an additional cooling loop for receiving heat from the fuel cell cooling loop through the heat exchanger. The additional cooling loop may be configured to selectively heat water in a water tank such that it can be provided as a hot water supply.

The power generation system may further comprise one or more valves in the additional cooling loop that are operable to selectively direct fluid in the additional cooling loop to heat the water in the water tank.

The power generation system may further comprise a heat removal component that selectively transfers heat from the fluid within the additional cooling loop to atmosphere. The heat removal component may comprise a radiator and a fan. The heat removal component may be configured to be automatically activated when the temperature of the fluid in the additional cooling loop exceeds a predetermined setpoint.

BRIEF DESCRIPTION OF THE DRAWINGS

One or more embodiments will now be described by way of example only with reference to the accompanying drawings in which:

FIG. 3 shows a power generation system that is a simplified view of some of the features of the power generation system of FIG. 2;

FIG. 4 shows a power generation system that is similar to the power generation system of FIG. 3;

DETAILED DESCRIPTION

The present disclosure relates to a power generation system that is an environmentally friendly alternative to diesel generators. The power generation system uses hydrogen fuel cells to provide electricity for applications where a reliable grid/shore power is not available or where the grid/shore power is potentially insufficient. Beneficially, no harmful emissions are produced when hydrogen fuel cells generate electricity and therefore the use of the power generation systems disclosed herein can be used in Clean Air Zones and can meet industry targets in relation to emissions.

As will be discussed in detail below, the power generation system can be provided as a standard shipping container such that it is transportable and can easily replace diesel generators. The power generation systems described herein can be particularly well-suited to satisfy short term power requirements for festivals or events, for example. They can also be used to provide temporary electric vehicle (EV) charging in car parks. Furthermore, they can be used to provide on-site power generation to support a sustainable construction industry.

Figure 1:
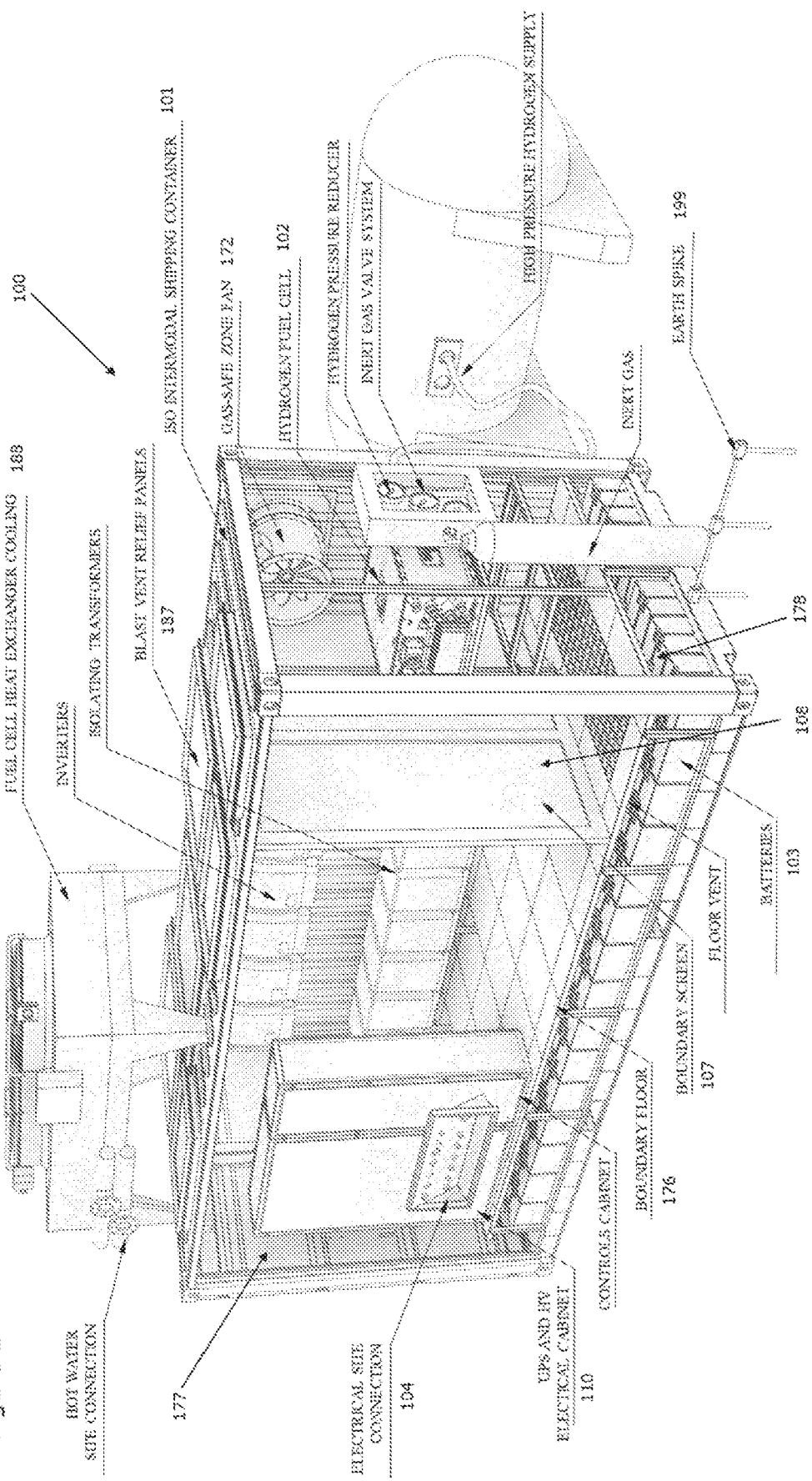
FIG. 1 shows an overview of an embodiment of a power generation system.

FIG. 1 shows an overview of an embodiment of a power generation system 100. As will be appreciated from the description that follows, the power generation system 100 can be considered as a complete transportable hydrogen fuel cell off-grid high power and heat generation system with zero carbon emissions.

The power generation system 100 includes a shipping container 101, which advantageously can be a standard shipping container 101 such that it can be conveniently transported using known transport methods (such as an articulated lorry) to a required location that requires an additional or alternative electrical power supply. For instance, the shipping container power generation system 100 can be a 20 ft (about 6.1 m) portable shipping container. As can be seen from FIG. 1, the majority of the components of the power generation system 100 in this example are located within the shipping container 101. Those components that are outside the shipping container 101 can readily be removed for transport and then reattached when the power generation system 100 is in situ.

The power generation system 100 includes a hydrogen fuel cell 102, which can be provided as a stack of fuel cells in order to provide a voltage level that is sufficient for the intended use of the power generation system 100. The fuel cell 102 can provide for high voltage DC current generation. In this example, the fuel cell 102 is provided in a fuel cell compartment 108 (which can be considered as a gas-safe room). The fuel cell compartment 108 is a defined volume in the shipping container 101 that is defined by an internal wall 107, which separates the gas fuel cell compartment 108 from the remainder of the internal cavity of the shipping container 101. As will be discussed in detail below, the fuel cell compartment 108 is provided as a safety feature to ensure that in the unlikely event that hydrogen does leak from the fuel cell 102, it is vented outside of the shipping container 101 and is not exposed to any potential ignition sources.

The power generation system 100 also includes one or more batteries, in this example a plurality of batteries 103. As will be discussed in detail below, the batteries 103 can be used to supplement the power provided by the fuel cell 102, or to temporarily provide power instead of the fuel cell 102. Additionally, the fuel cell 102 can be used to charge the batteries 103.

Although not visible in FIG. 1, the power generation system 100 also includes connections for a shore/grid power supply if one is available. Such a shore/grid power supply can be supplemented by the fuel cell 102 and/or batteries 103. Also, the fuel cell 102 and/or batteries 103 can be used as a backup to the shore/grid power supply.

The power generation system 100 can advantageously be used to provide an uninterruptable power supply (UPS), which can be facilitated by the power generation system 100 being able to provide electricity from the fuel cell 102 and/or the batteries 103, and in some examples also a shore/grid power supply. Furthermore, any locally generated electricity (by the fuel cell 102) does not produce any emissions.

As shown in FIG. 1, the power generation system 100 includes power outlets 104, which are used to access the electricity that is provided by the power generation system 100. In the drawing, the power outlets 104 are identified as electrical site connections because they provide the electrical connections/sockets for the site at which the power generation system 100 is located. The power outlets 104 are accessible from outside the shipping container 101, and they are provided as part of a UPS (uninterruptable power supply) and HV (high voltage) electrical cabinet 110.

In one implementation, the power generation system 100 of FIG. 1 can provide 250 kVA of standard three phase, 400V critical electrical power backed up by an integral 216 kWh battery system. In this way 250 KW of off-grid energy can be provided. Furthermore, multiple power generation systems 100 can be combined to provide a fully resilient system that can provide up to 2 MW.

Other features of FIG. 1 will be described in more detail below.

It will be appreciated that any instance of a current, voltage or power signal described herein, can instead be implemented as a signal that represents one of the other two parameters. As one example, if a current signal is described then a power signal can be used instead by assuming that the voltage is constant.

Control System

Figure 2:
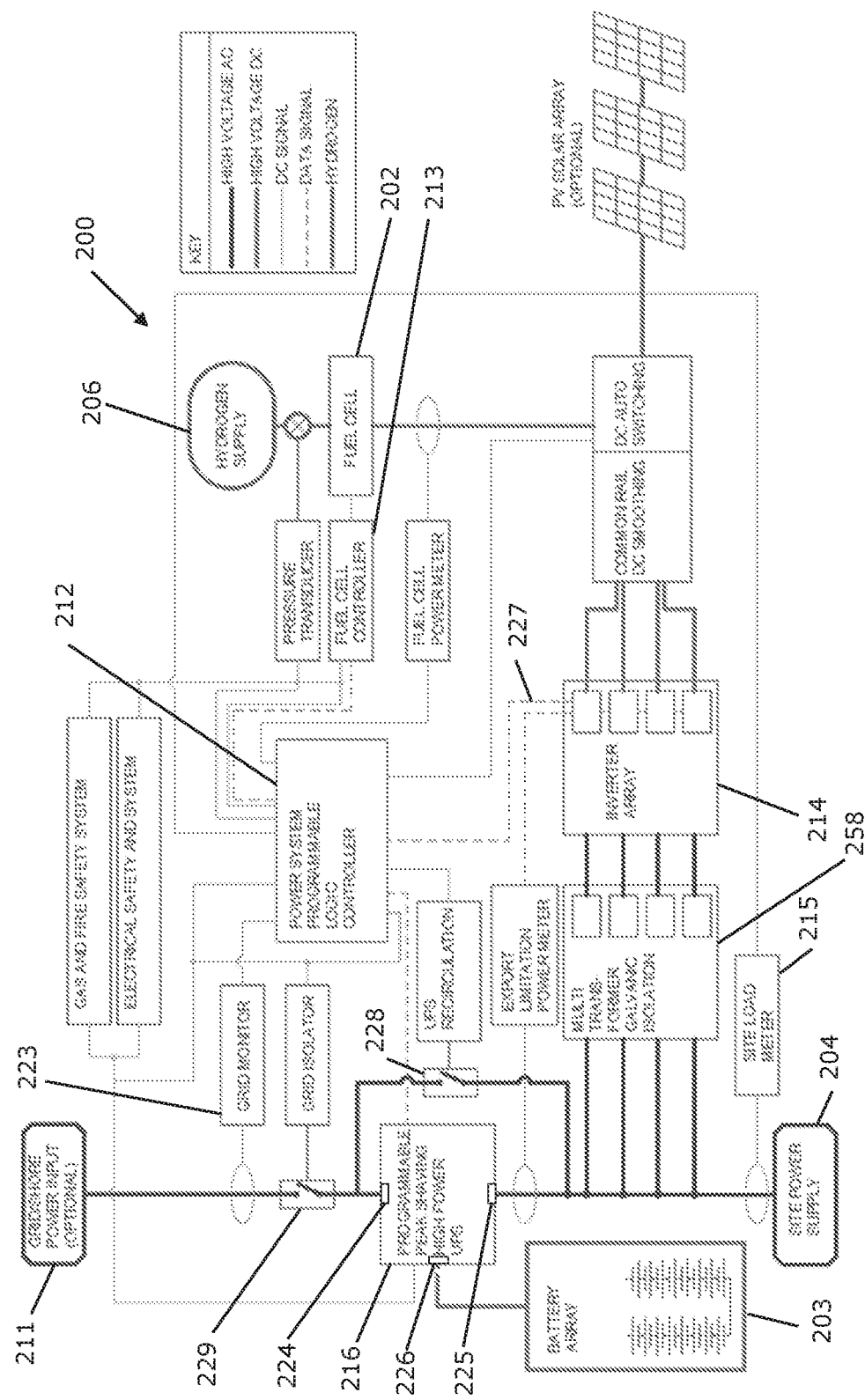
FIG. 2 shows a schematic diagram of an example embodiment of a power generation system.

FIG. 2 shows a schematic diagram of an example embodiment of a power generation system 200, and in particular will be used to describe how it can be controlled.

FIG. 2 shows a power generation system 200 that includes a fuel cell 202 (which receives hydrogen from a hydrogen fuel supply 206) and batteries 203 (which are illustrated as a battery array). FIG. 2 also shows a power outlet 204 (labelled as a site power supply), and an optional grid-supply-connector 211 for connecting to an incoming grid/shore power supply.

The power generation system 200 in this example includes an inverter 214 that converts a DC voltage that is provided by the fuel cell 202 into an inverter-AC-voltage for providing to the power outlet 204.

A controller 212 is shown in FIG. 2, which in this example is implemented as a programmable logic controller (PLC). It will be appreciated that the functionality of the controller 212 may be provided by a single component or may be provided by a plurality of distributed components. In some examples, an uninterruptable power supply (UPS) 216 can provide some of the control functionality that is described below.

We will now describe various aspects of how a power generation system 200 can be controlled, and we will describe how it can be used to regulate and maintain a reliable and uninterrupted power output at the power outlet 204. The power generation system 200 advantageously includes the functionality to increase the power and reliability of an available grid/shore supply.

FIG. 3 shows a power generation system 300 that has broadly similar functionality to some of the features of the power generation system of FIG. 2. Components of FIG. 3 that are also shown in an earlier figure will be given corresponding reference numbers in the 300 series.

The power generation system 300 of FIG. 3 includes a power outlet 304 that provides the output power from the power generation system 300. In this example an AC power outlet 304' and a DC power outlet 304" are provided, which can collectively be referred to as the power outlet 304. As indicated above, the power outlet 304 can include a plurality of electrical sockets that can be used to receive power from the power generation system 300.

The power generation system 300 also includes a fuel cell 302 that can selectively provide power for the power outlet 304. The fuel cell 302 can provide power, the fuel cell 302 can provide power selectively in that it can be controlled such that at any given time it either does or does not provide power for the power outlet 304. In FIG. 3, the fuel cell 302 is shown as being capable of providing power to the DC power outlet 304". Additionally, the fuel cell 302 can provide power to the AC power outlet 304' via an inverter 314. The inverter 314 converts a DC voltage that is provided by the fuel cell 302 into an inverter-AC-voltage for providing to the power outlet 304. The fuel cell in FIG. 2 is also shown as being capable of providing power directly to the power outlet. In other examples, such as FIGS. 5 and 6, the fuel cell 302 can indirectly provide power for the power outlet 304, for instance by charging a battery that provides power for the power outlet 304.

FIG. 3 also shows a battery 303 that can selectively provide power for the power outlet 304 (either the AC power outlet 304' or the DC power outlet 304"). It will be appreciated that the battery 303 can be provided as a battery array in the same way as is shown in FIG. 2. In this example, the battery 303 is shown as directly providing power to the power outlet 304. However, as will be appreciated from the description of other examples in this document, in some examples the battery 303 can provide power to a UPS, and the UPS provides power to the power outlet 304.

FIG. 3 also shows a controller 312. The controller 312 receives a system-load-signal 317 that represents the amount of power that is required by an external load that is connected to the power outlet 304. Such a system-load-signal 317 can be provided by a site load meter (shown in FIG. 2 with reference 215) that monitors the load at the power outlet 304. The system-load-signal 317 can provide a value in Volt Amps, which is a suitable unit for all AC load and power conditions. Volts can be used for battery charge levels. The fuel cell load can be regulated by DC Amps current.

The controller 312 also receives one or more fuel-cell-parameters 318 that represent one or more operating parameters of the fuel cell. The fuel-cell-parameters 318 can include fixed-fuel-cell-parameters that represent fixed/non-varying parameters of the fuel cell 302. Examples of such fixed-fuel-cell-parameters include:
- a maximum-current-rating that represents the maximum current level that can be provided by the fuel cell 302;
- a minimum-current-rating that represents the minimum current level that can be provided by the fuel cell 302. For example, if the fuel cell 302 does not provide the minimum current level the fuel cell 302 can stall;
- a minimum-hydrogen-supply-pressure that represents a minimum hydrogen supply pressure (Bar); and
- a maximum-coolant-temperature that represents a maximum coolant temperature (° C.).

The fuel-cell-parameters 318 can also include sensed-fuel-cell-parameters that represent sensed/variable parameters of the fuel cell 302. Examples of such sensed-fuel-cell-parameters include:
- a fuel-cell-temperature that represents the temperature of the fuel cell, such as the temperature of coolant in an internal coolant loop;
- a fuel-cell-voltage that represents a voltage level that is being provided by the fuel cell;
- a fuel-cell-current that represents the level of current provided by the fuel cell;
- a hydrogen-supply-pressure that represents a sensed value of the hydrogen supply pressure; and
- one or more fault-signals, which represent fault signals sent by a fuel cell controller, which in the example of FIG. 2 is shown with reference 213.

The controller 312 can then provide a fuel-cell-power-control-signal 319 based on the system-load-signal 317 and the one or more fuel-cell-parameters 318. For example such that any sensed-fuel-cell-parameters do not exceed a corresponding threshold or limit that is defined by a fixed-fuel-cell-parameter. The fuel-cell-power-control-signal 319 is for controlling the power that is drawn from the fuel cell 302. As shown in FIG. 3, the fuel-cell-power-control-signal 319 can be provided to the fuel cell 302 or to the inverter 314. In this way, the fuel-cell-power-control-signal 319 can be for setting a control-parameter of the fuel cell 302 or the inverter 314. The fuel-cell-power-control-signal 319 can be configured to:
- control a hydrogen fuel supply to the fuel cell 302; and/or
- reduce inverter 314 loads.

Advantageously, the controller 312 can therefore control the power that is drawn from the fuel cell 302 such that the power that is available at the power outlet 304 is sufficient to meet a load that is connected to the power outlet 304.

In this example, the controller 312 also receives a battery-charge-signal 321 that represents a level of charge of the battery 303. The battery-charge-signal 321 can be provided as a direct measurement of the voltage of the battery 303, or can be provided by the UPS in examples that include a UPS. The controller 312 can therefore provide the fuel-cell-power-control-signal 319 also based on the battery-charge-signal 321.

For instance, the controller 312 can determine a fuel-cell-target-current based on the system-load-signal 317 and the battery-charge-signal 321. In one application, the battery-charge-signal 321 can represent a voltage that determines the charge level of the battery 303. In this way, the fuel-cell-target-current represents a target current level for the fuel cell 302 such that the power generation system 300 can provide power to the power outlet 304 that is sufficient to service the load, and also charge the battery 303. The controller 312 can then set the fuel-cell-power-control-signal 319 based on the fuel-cell-target-current. In the example of FIG. 3, the fuel cell 302 can supplement a grid supply voltage such that the battery 302 can be charged (as shown in FIG. 4).

It will be appreciated that the fuel-cell-target-current is an example of a fuel-cell-target-value. Other examples of a fuel-cell-target-value include a fuel-cell-target-power and a fuel-cell-target-current. In various of the examples disclosed herein, when any one of the examples of a fuel-cell-target-value is described, it will be appreciated that any of the other two examples of a fuel-cell-target-value can be used instead.

In this example, where the fuel cell 302 and the inverter 314 provide AC power directly to the power outlet 304, the controller 312 controls the power drawn from the inverter 314 such that it is sufficient to cover site loads and to charge the battery 303. This can be implemented by setting a fuel-cell-target-current based on the system-load-signal 317 and the battery-charge-signal 321.

As shown in FIG. 3, the power generation system 300 further includes a grid-supply-connector 311 for receiving a grid supply voltage. As indicated above, advantageously such a power generation system 300 can be used to supplement the grid supply voltage or disconnect and replace the grid supply voltage, without interruption, if it is unreliable/unstable.

In this example the controller 312 also receives a grid-supply-signal 322 that represents a power level of the grid supply. Such a grid-supply-signal 322 can be provided by a grid monitor (shown in FIG. 2 with reference 223) that monitors the grid supply that is received at the grid-supply-connector 311. The grid monitor can be implemented as a phase monitoring relay and/or a voltage monitoring relay. The controller 312 can then determine the fuel-cell-target-current also based on the grid-supply-signal 322. For instance, when a grid supply is available, then the power generation system 300 may be configured to only use the fuel cell 302 when the grid supply power is inadequate (in terms of servicing the load at the power outlet 304 and/or charging the battery 303 in some examples). That is, the power generation system 300 may be controlled such that power received from the grid supply takes precedence over power that is generated locally by the fuel cell 302. This can be advantageous as it preserves the hydrogen fuel supply.

Therefore, the controller 312 can determine a power-outlet-target-power by adding a voltage that is represented by the system-load-signal 317 to the voltage that is required to charge the battery 303 (as represented by the battery-charge-signal 321). The controller 312 can then determine the fuel-cell-target-current based on the difference between the power level of the grid supply (as represented by the grid-supply-signal 322) and the power-outlet-target-power.

If the power-outlet-target-power is greater than the level of the grid supply, then the power generation system 300 requires the fuel cell 302 to provide power in order for the load that is connected to the power outlet 304 to be adequately serviced and the battery 303 to be charged. If not, then the grid/shore supply is considered sufficient and the fuel cell 302 does not need to provide power.

In another example, the controller 312 may be configured to control the power generation system 300 such that the fuel cell 302 is not required to charge the battery 303. In which case, the controller 312 can determine the fuel-cell-target-current based on the difference between the power level of the grid supply (as represented by the grid-supply-signal 322) and the power that is represented by the system-load-signal 317.

In some examples, the controller 312 may receive a grid-supply-characteristic-signal that represents a characteristic of the grid supply that is received at the grid-supply-connector 311. The grid-supply-characteristic-signal can represent one or more of: the power level of the grid supply (which is described above as a grid-supply-power-signal 322); a frequency of the grid supply (which can be implemented as a grid-supply-frequency-signal); and a phase of the grid supply (which can be implemented as a grid-supply-phase-signal). The controller 312 can then provide the fuel-cell-power-control-signal 319 also based on the grid-supply-characteristic-signal.

In an example where the grid-supply-characteristic-signal comprises a grid-supply-power (that represents a power level of the grid supply), the controller 312 can determine a supply-threshold based on the system-load-signal 317. For instance, the controller 312 can simply set the supply-threshold as the power that is required by the load that is connected to the power outlet 304 (as determined from the system-load-signal 317). Alternatively, the controller 312 can set the supply-threshold as the sum of: (i) the power that is required by the load that is connected to the power outlet 304, and (ii) the power that is required to charge the battery 303 (as discussed above).

The controller 312 can then compare the grid-supply-power-level with the supply-threshold and:
- if the grid-supply-power-level 322 is less than the supply-threshold, then set the fuel-cell-power-control-signal 319 such that the fuel cell 302 provides power for the power outlet 304; or
- if the grid-supply-power-level 322 is greater than or equal to the supply-threshold, then set the fuel-cell-power-control-signal 319 such that the fuel cell 302 does not provide power for the power outlet 304.

In an example where the grid-supply-characteristic-signal comprises a grid-supply-frequency-signal (that represents the frequency of the grid supply voltage), the controller 312 can compare the grid-supply-frequency-signal with one or more frequency-thresholds in order to determine if the grid-supply-frequency-signal is out of bounds, and:
- if the grid-supply-frequency-signal is out of bounds, then set the fuel-cell-power-control-signal 319 such that the fuel cell 302 provides power for the power outlet 304 and/or disconnect the grid connector 311 from the power outlet 304; or
- if the grid-supply-frequency-signal is not out of bounds (i.e. its frequency is acceptable), then set the fuel-cell-power-control-signal 319 such that the fuel cell 302 does not provide power for the power outlet 304 and/or reconnect the grid connector 311 to the power outlet 304 if it has been previously disconnected.

The controller 312 can function in a similar way in examples where the grid-supply-characteristic-signal comprises a grid-supply-phase-signal (that represents the phase of the grid supply voltage. That is, the controller 312 can compare the grid-supply-phase-signal with one or more phase-thresholds in order to determine if the grid-supply-phase-signal is out of bounds, and:
- if the grid-supply-phase-signal is out of bounds, then set the fuel-cell-power-control-signal 319 such that the fuel cell 302 provides power for the power outlet 304 and/or disconnect the grid connector 311 from the power outlet 304; or
- if the grid-supply-phase-signal is not out of bounds (i.e. its phase is acceptable), then set the fuel-cell-power-control-signal 319 such that the fuel cell 302 does not provide power for the power outlet 304 and/or reconnect the grid connector 311 to the power outlet 304 if it has been previously disconnected.

In this way, the fuel cell 302 can be controlled such that it is only used to provide power when the power available at the grid-supply-connector 311 is insufficient or otherwise unacceptable.

The controller 312 can further determine a fuel-cell-target-current based on the difference between the grid-supply-power-level 322 and the supply-threshold. If the grid-supply-power-level 322 is less than the supply-threshold, then the controller 312 can set the fuel-cell-power-control-signal 319 based on the fuel-cell-target-current. That is, so that the fuel cell 302 supplies the appropriate power.

Figure 6:
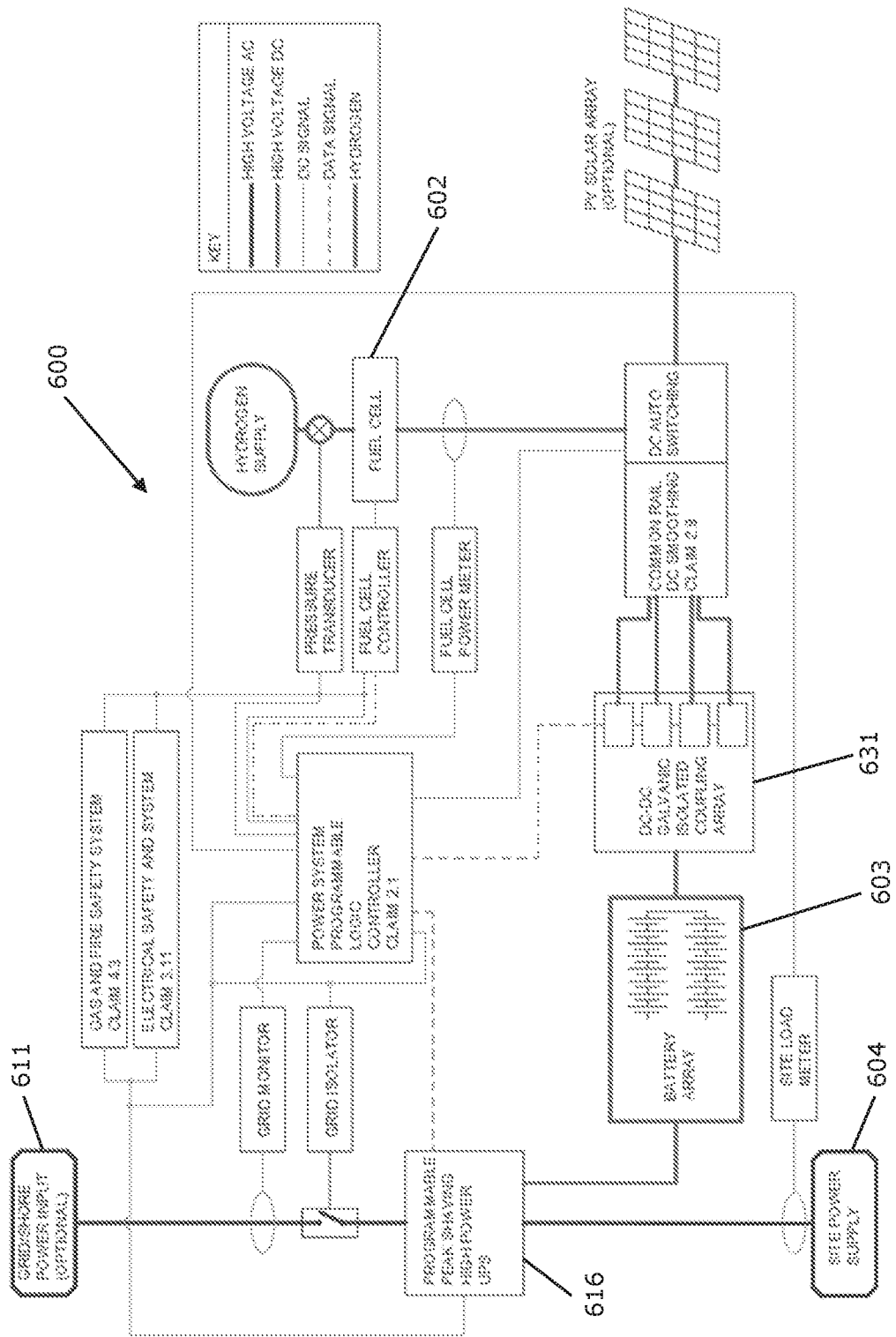
FIG. 6 shows another example of a power generation system, which is a more detailed illustration of the system of FIG. 5.

Some examples of the power generation system disclosed herein can include additional sources of power. For instance, as shown in FIGS. 2 and 6, a photovoltaic (PV) solar array can provide an additional source of power for the power outlet either directly (as shown in FIG. 2) or indirectly by charging a battery (as shown in FIG. 6). In some examples, the power generation system can provide AC or DC power to the power outlet 304.

FIG. 4 shows a power generation system 400 that is similar to the power generation system of FIG. 3. Components of FIG. 4 that are also shown in an earlier figure will be given corresponding reference numbers in the 400 series.

FIG. 4 includes an uninterruptable power supply (UPS) 416 that has: a grid-input terminal 424, a power-output-terminal 425 and a battery-connection-terminal 426. The grid-input terminal 424 is connected to the grid-supply-connector such that it receives a grid supply voltage when one is available. The power-output-terminal 425 is connected to the power outlet 404. The battery-connection-terminal 426 is connected to the battery 403. This is different to the power generation system of FIG. 3 where the DC output of the fuel cell and/or battery is shown as directly connected to the power outlet.

As is known in the art, a UPS 416 provides emergency power (as received from the battery 403 in this example) to a load (that is connected to the power-output-terminal 425 via the power outlet) when the grid power (at the grid-input terminal 424) fails. That is, the UPS 416 provides power that it receives at the grid-input terminal 424 and/or the battery-connection-terminal 426 to the power-output-terminal 425. The UPS 416 can also provide power that it receives at the grid-input terminal 424 to the battery-connection-terminal 426 in order to charge the battery 403 that is connected to the battery-connection-terminal 426. Therefore, the UPS 416 can provide at least some of the control functionality that is described herein in relation to how the battery 403 is used to selectively provide power for the power outlet 404.

In the example shown in FIG. 4, the fuel cell 402 provides power to the power outlet 404 via the inverter 414. This is consistent with the more detailed drawing of FIG. 2.

In order to manage site demand, the UPS 416 can regulate power using a battery 403 (which may be implemented as a battery array) for short periods when:

Insufficient power is available at the grid-supply-connector 411 from the grid supply;

The fuel cell 402 or inverter 414 is temporarily unavailable; or

The power required by the site to be drawn from the power outlets 404 exceeds the available power from the fuel cell 402 or the grid supply at the grid-supply-connector 411. This can be known as "peak shaving".

In this example, the inverter 414 can be configured in order to satisfy the site load demand and battery charging demand of the UPS 416. The controller 412 can monitor this overall demand, and if the fuel cell 402 is overloaded then the controller 412 can send a signal to reduce the inverter output 414. If demand is not sufficient to meet the minimum load requirement of the fuel cell then the controller 412 can standby the inverters and introduce a DC idle load temporarily (or shut down if this time is longer). The fuel cell 402 will then restart when required.

Figure 5:
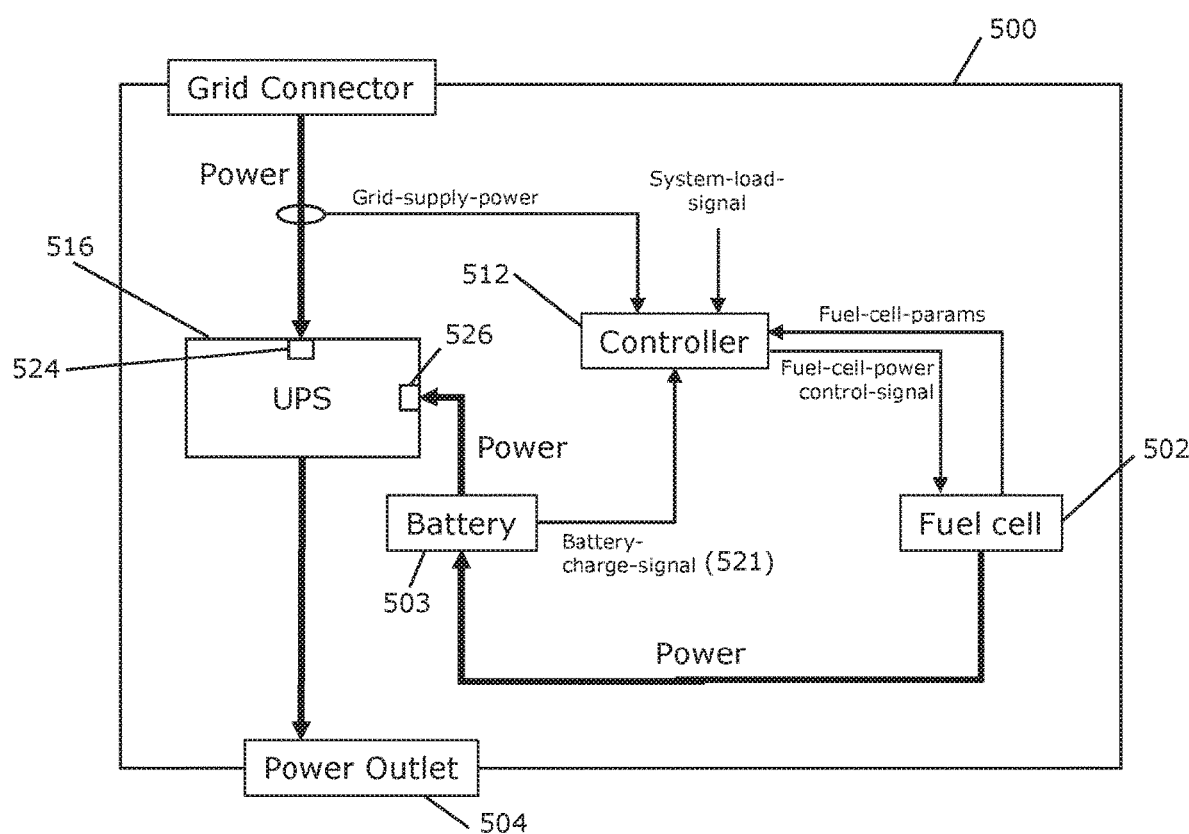
FIG. 5 shows another example of a power generation system, in which the fuel cell provides power to charge the battery.

FIG. 5 shows another example of a power generation system 500, in which the fuel cell 502 provides power to charge the battery 503. FIG. 5 shows a power generation system 500 that is similar to the power generation system of FIG. 4. Components of FIG. 5 that are also shown in an earlier figure will be given corresponding reference numbers in the 500 series.

In FIG. 5, the fuel cell 502 selectively provides power for the power outlet 504 indirectly, in that it is used to charge the battery 503. In turn, the battery 503 is connected to the battery-connection-terminal 526 of the UPS 516 such that the battery 503 provides power for the power outlet 504 when the UPS 516 determines that the grid supply voltage is inadequate. In this way, the power generation system 500 can advantageously utilise the well-established control algorithms of a UPS 516 to provide power to the power outlet 504 based on the signals that are received at the grid-input terminal 524 and the battery-connection-terminal 526. Furthermore, the fuel cell 502 can be controlled such that it provides enough DC power to the battery circuit to cover the UPS supply requirements and charge the battery 503 when required so that the power generation system 500 can continue to provide power to the power outlet 504 when the battery 503 would otherwise have discharged.

In this way, the UPS 516 can effectively run indefinitely from the battery input 503 if the grid is not present. The controller 512 can monitor the battery voltage and control the fuel cell 502 such that it adds power accordingly to keep the voltage stable (optionally using a DC-DC converter such as the one shown in FIG. 6 with reference 631, but not shown in FIG. 5). The fuel cell 502 can be controlled such that the battery 503 is charged to a set voltage, which can represent the nominal full charge of the battery 503. In other words, the controller 512 can determine a fuel-cell-target-current based on the battery-charge-signal 521. For instance, the controller 512 can set the fuel-cell-target-current based on a difference between the battery-charge-signal 521 and a battery-full-charge threshold level, and then set a fuel-cell-power-control-signal to cause the fuel cell 502 to charge the battery 503 when the battery-charge-signal 521 is less than the battery-full-charge threshold level.

In FIG. 5, therefore, the battery 503 can be directly charged by the fuel cell 502. In this way, the fuel cell 502 can charge the battery 503 and also provide power for the power outlet 504 (via the battery-connection-terminal 526 of the UPS 516).

FIG. 6 shows another example of a power generation system 600, which is a more detailed illustration of the system of FIG. 5. Again, components of FIG. 6 that are also shown in an earlier figure will be given corresponding reference numbers in the 600 series.

As can be seen from FIGS. 5 and 6, an inverter is not required at the output of the fuel cell 502, 602 because the battery 503, 603 can be charged by the DC voltage that is provided by the fuel cell 502, 602. As is known in the art, the UPS 516, 616 can include the functionality of an inverter to convert the DC voltage that is provided by the battery 503, 603 to an AC voltage that is suitable for providing to the power outlet 504, 604.

Returning to FIG. 2, the UPS has a grid-input terminal 224, a power-output-terminal 225 and a battery-connection-terminal 226. The grid-input terminal 224 is connected to the grid-supply-connector 211 for receiving a grid/shore voltage supply if one is available. The power-output-terminal 225 is connected to the power outlet 204. The battery-connection-terminal 226 is connected to the battery 203.

In a similar way to that described above, the controller 212 receives a grid-supply-characteristic-signal that represents a characteristic level of the grid supply voltage such as the voltage level, frequency, phase of the grid supply voltage. The controller 212 can then provide an inverter-control-signal 227 to the inverter 214 based on the grid-supply-characteristic-signal. The inverter-control-signal 227 is for setting or limiting the inverter power output supplied, for example by specifying the power output of the inverters 214 based on site demand and available power at the fuel cell 202. Grid synchronisation of the inverters can be provided by pre-existing 'Grid-Tie' functionality of solar inverters.

Once fuel cell 202 power is available, the UPS output is used for synchronising the inverter 214 (in this example a grid-tie inverter array) which can then convert the DC fuel cell output into usable AC grid supply. Synchronising the inverter-AC-voltage with the grid supply voltage in this way enables both the grid and the fuel cell 202 to provide power to the power outlet 204 at the same time without interfering with each other.

Furthermore, in the example of FIG. 2, the power generation system 200 includes a recirculation-switch 228 that is configured to selectively connect the power-output-terminal 225 of the UPS 216 to the grid-input terminal 224 of the UPS 226 (whilst simultaneously disconnecting the shore/grid input if one is present). Selectively connecting the power-output-terminal 225 to the grid-input terminal 224 is entirely counter-intuitive to what is taught in the art. The skilled person expects the UPS 216 to provide power that is received at the grid-input terminal 224 to the power-output-terminal 225. When a UPS 216 is used in a conventional way, there is no reason to connect the power-output-terminal 225 to the grid-input terminal 224—indeed, the skilled person would think that doing so would cause the UPS 216 to malfunction because it is "chasing its tail". However, when the UPS 216 is used in combination with a fuel cell 202 as described herein, the inventors have unexpectedly found that there are advantages to using the UPS 216 in this way as will be described below. Therefore, the inverter-AC-voltage can be recirculated to the UPS input (the grid-input terminal 224) to form a self-contained island grid supply.

By recirculating the supply in this way the UPS 216 can have the ability to constantly recharge the battery 203, even if a grid supply is not available at the grid-supply-connector

211. As discussed in detail above, this additional charging power can be registered by the controller 212 and the power provided by the fuel cell 202 can be increased accordingly to account for both site load and battery charging.

The controller 212 operates the recirculation-switch 228 based on the grid-supply-characteristic-signal. For instance, the controller 212 can operate the recirculation-switch 228 such that it connects the power-output-terminal 225 to the grid-input terminal 224 if the grid-supply-characteristic-signal does or does not (depending on the characteristic) exceed a grid-supply-threshold. The grid-supply-threshold can represent a boundary between an acceptable and an unacceptable grid supply voltage. An unacceptable grid supply voltage can be one that has too low a voltage. In this way, the grid-supply-threshold can be a grid-supply-voltage-threshold.

Alternatively or additionally, an unacceptable grid supply voltage may be determined by processing a grid-supply-phase-signal that represents the phase of the grid supply voltage. Such a grid-supply-phase-signal can be provided by phase monitoring sensor relays. Such relays can provide the functionality of being able to set limits for over-voltage, under-voltage, phase error, phase loss, voltage imbalance, and neutral line disconnection, and then provide an unacceptable-grid-supply-signal if any of the corresponding grid-supply-characteristic-signals exceeds any of those limits/thresholds. The controller 212 can then operate the recirculation-switch 228 such that it connects the power-output-terminal 225 to the grid-input terminal 224 in response to the unacceptable-grid-supply-signal. In this way, the controller can set the unacceptable-grid-supply-signal to detect a failing grid.

It will be appreciated that the grid-supply-threshold can be any threshold that is suitable for identifying an unacceptable grid supply from a grid-supply-characteristic-signal. Whatever type of threshold/s is/are used, if the grid power received at the grid-supply-connector 211 is insufficient for a significant period and battery supply is becoming insufficient, the power generation system 200 will automatically disconnect from the grid-supply-connector 211, start the fuel cell 202 and move to an isolated supply. Advantageously, the UPS system 216 is able to stabilise and supplement grid power for short periods of time.

Therefore, the inverter-AC-voltage that is provided by the inverter 214 provides power to both the power outlet 204 and the grid-input terminal 224 when the recirculation-switch 228 is closed/conducting. Advantageously, this enables the UPS 216 to continue to operate seamlessly as if the grid supply were being received at the grid connector 211 such as by charging the battery 203 if appropriate. In this way, the fuel cell 202 can be considered as assuming the role of the grid supply when it is not available or otherwise unacceptable.

Examples disclosed herein can therefore enable the charging of a battery string 203 of a UPS 216 using a hydrogen fuel cell 202 such that the UPS 216 is able to supply power reliably and indefinitely to a site in the absence of a grid or by supplementing an insufficient or unreliable grid. In this way the UPS 216 is unaware of the presence of the fuel cell 202 and it's certified and tested reliability remains unaffected. This can be achieved in two different ways:

- with reference to FIG. 2: by controlling the fuel cell 202 such that it produces more power than is consumed by the site being connected to the power outlet 204, converting this power independently with inverters 214 and synchronising to the grid. Recirculating this excess power to the grid-input terminal 224 of the UPS 216 (via the recirculation-switch 228) allows the UPS 216 to manage the battery charging process.
- with reference to FIG. 6: by controlling the fuel cell 602 such that it produces and injects excess power directly into the UPS battery circuit 603 using a DC-DC coupling 631 such that the UPS 616 will see an indefinite battery supply at the battery-connection-terminal to supplement or create a stable grid.

The power generation system 200 of FIG. 2 further includes a grid-isolation-switch 229 that can selectively disconnect the grid-input terminal 224 of the UPS 216 from the grid-supply-connector 211. Again, the controller 212 can operate the grid-isolation-switch 229 based on the grid-supply-characteristic-signal. For example, the controller 212 can operate the grid-isolation-switch 229 such that it disconnects the grid-input terminal 224 from the grid-supply-connector 211 if the grid-supply-characteristic-signal does or does not (depending upon the characteristic) exceed the grid-supply-threshold. In this way, when the grid supply voltage received at the grid-supply-connector 211 is considered unacceptable (because it does not satisfy the grid-supply-threshold): the grid-supply-connector 211 is disconnected from the grid-input terminal 224 of the UPS 216; and the power-output-terminal 225 is connected to the grid-input terminal 224 of the UPS 226. Disconnecting the grid-supply-connector 211 in this way can advantageously prevent the unacceptable grid supply that is provided to the grid-supply-connector 211 from interfering with the inverter-AC-voltage output provided by the inverter 214 that is now also being provided to the grid-input terminal 224 of the UPS 216.

Beneficially, the controller 212 can set the grid-isolation-switch 229 such that it disconnects the grid-input terminal 224 of the UPS 216 from the grid-supply-connector 211 before (for instance by applying a minimum time delay) it sets the recirculation-switch 228 such that it connects the power-output-terminal 225 to the grid-input terminal 224 of the UPS 216. In this way, the grid supply voltage and the inverter-AC-voltage provided by the inverter 214 are not simultaneously provided to the grid-input terminal 224, and therefore the likelihood of any interference can be further reduced or removed. In this way, the grid-isolation-switch 229 and the recirculation-switch 228 can be operated as a break before make switching operation.

Figure 7:
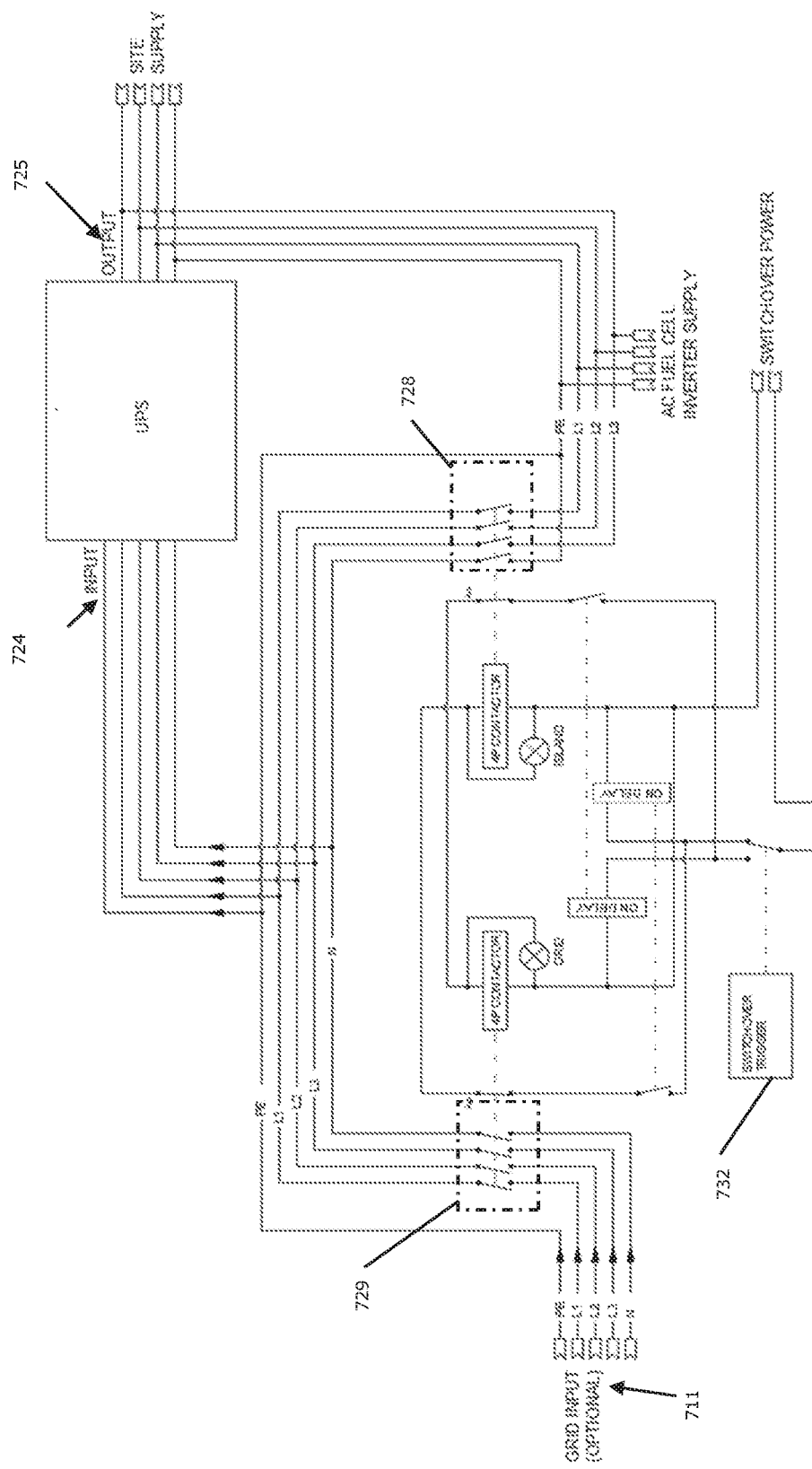
FIG. 7 shows an example implementation of a circuit that can be used to control the recirculation-switch and the grid-isolation-switch of FIG. 2.

FIG. 7 shows an example implementation of a circuit that can be used to control the recirculation-switch and the grid-isolation-switch of FIG. 2.

FIG. 7 shows a grid-supply-connector 711, which includes a protective earth (PE) terminal, a neutral terminal (N) and three live terminals (L1, L2, L3). FIG. 7 also shows a grid-input-terminal 724 of a UPS, which has the same terminals as the grid-supply-connector 711. A grid-isolation-switch 729 is connected between the grid-supply-connector 711 and the grid-input terminal 724. As shown, the grid-isolation-switch 729 can selectively disconnect 4 terminals (L1, L2, L3 and N) of the grid-input terminal 724 of the UPS from the corresponding terminals of the grid-supply-connector 711. As discussed above, the grid-isolation-switch 729 is used to selectively disconnect the grid supply from the UPS, especially when the grid supply is considered unacceptable.

FIG. 7 also shows a power-output-terminal 725, which includes a protective earth (PE) terminal and three live terminals (L1, L2, L3). As discussed above with reference to FIG. 2, the power-output-terminal 725 is connected to the power outlet of the power generation system. The poweroutput-terminal 725 is also connected to the output of the inverter such that inverter-AC-voltage is also present at the power-output-terminal 725.

A recirculation-switch 728 is connected between the power-output-terminal 725 and the grid-input terminal 724. As shown, the recirculation-switch 728 can selectively connect the three live terminals (L1, L2, L3) of the power-output-terminal 725 to the corresponding terminals of the grid-input terminal 724. As discussed above, the recirculation-switch 728 is used to selectively connect the power-output-terminal 725 to the corresponding terminals of the grid-input terminal 724.

The recirculation-switch 728 can also selectively connect the PE terminal of the power-output-terminal 725 to the neutral terminal of the grid-input terminal 724, and also to one or more localised earth rods (which is shown in FIG. 1 with reference 199 and FIG. 10 with reference 1099), or similar earthing arrangements. The PE terminal of the power-output-terminal 725 is hard-wired to the PE terminal of the grid-input terminal 724. This will be discussed in more detail below in relation to a neutral earth switching system to allow safe switching between a shore grid and an isolated grid/earth supply and will be described with reference to FIG. 10.

A switchover-trigger-signal 732 is schematically illustrated in FIG. 7, which is used to change the states of the recirculation-switch 728 and the grid-isolation-switch 729 so that the input to the UPS transitions between the grid supply voltage (from the grid-supply-connector 711) and a recirculating voltage (from the fuel cell). A controller (not shown in FIG. 7) can provide the switchover-trigger-signal 732 in any way that is described herein, such as when a grid-supply-characteristic-signal does not exceed an acceptable grid-supply-threshold.

The circuit of FIG. 7 is an implementation of a guaranteed break before make electrically interlocking timer contactor circuit, which is used to ensure that recirculating/island and shore grid connections can never be engaged together. Furthermore, there is a built-in delay which prevents sudden transition between supplies. This can also ensure that the UPS fully disengages from the shore grid supply such that it will resynchronise to its own output and inverters when the recirculation is engaged.

Figure 8:
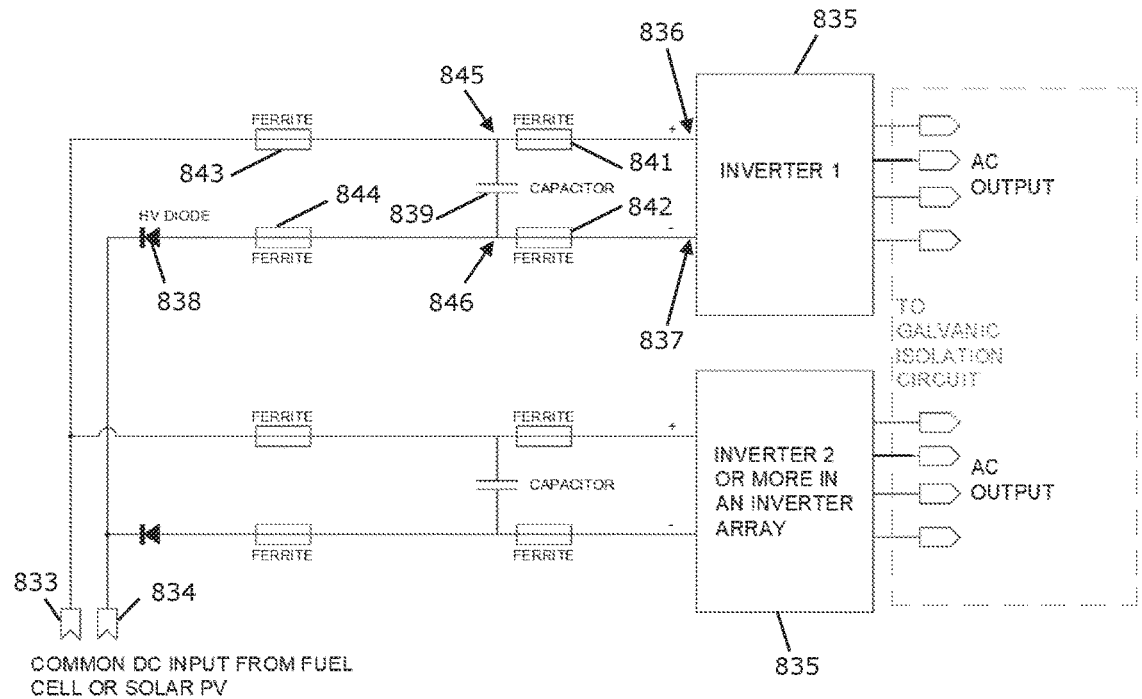
FIG. 8 shows an inverter circuit that allows multiple inverters to be used in an array with a common high power DC supply, such as is provided by the hydrogen fuel cells described herein.

FIG. 8 shows an inverter circuit that allows multiple inverters to be used in an array with a common high power DC supply, such as is provided by the hydrogen fuel cells described herein.

The inverter circuit includes a DC-input-terminal 833 and a reference-terminal 834 across which a DC voltage signal is provided when in use. In this example the DC voltage signal is provided by a fuel cell. Although in principle the inverter circuit of FIG. 8 could be used with a solar photovoltaic cell that provides the DC voltage signal, especially if the DC voltage level is greater than the rating of an in individual inverter 835.

The circuit of FIG. 8 includes a plurality of inverters 835. When the plurality of inverters 835 are provided in the manner shown in FIG. 8 they can be considered as an inverter array. Each inverter 835 has a first-inverter-input-terminal 836 and a second-inverter-input-terminal 837. Each of the plurality of inverters is configured to convert a DC voltage received across the first-inverter-input-terminal 836 and the second-inverter-input-terminal 837 in order to provide an AC voltage output (referred to as an inverter-AC-voltage elsewhere in this document).

FIG. 8 also includes a plurality of diodes 838, one for each of the plurality of inverters 835. The first-inverter-input-terminal 836 of each of the plurality of inverters 835 is galvanically connected to the DC-input-terminal 833. The second-inverter-input-terminal 837 of each of the plurality of inverters 835 is connected to the reference-terminal 834 through a respective one of the plurality of diodes 838 such that current is inhibited from flowing from the reference-terminal 834 to the second-inverter-input-terminal 837. The diodes 838 can be considered as anti-feedback diodes and are used to produce a common DC rail that is suitable for connecting the DC voltage provided by a fuel cell to the input terminals of a plurality of inverters 835.

The circuit of FIG. 8 also includes a plurality of capacitors 839, one for each of the plurality of inverters 835. Each of the capacitors 839 is connected between the first-inverter-input-terminal 836 and the second-inverter-input-terminal 837 of a respective one of the plurality of the inverters 835.

The circuit further includes: a plurality of first-inverter-input-ferrites 841, one for each of the plurality of inverters 835; and a plurality of second-inverter-input-ferrites 842, again one for each of the plurality of inverters 835. Each of the plurality of first-inverter-input-ferrites 841 is connected in series between the first-inverter-input-terminal 836 of a respective one of the plurality of the inverters 835 and the DC-input-terminal 833. Each of the plurality of second-inverter-input-ferrites 842 is connected in series between the second-inverter-input-terminal 837 of a respective one of the plurality of the inverters 835 and the reference-terminal 834.

Further still, the circuit includes: a plurality of DC-input-ferrites 843, one for each of the plurality of inverters 835; and a plurality of reference-input-ferrites 844, again one for each of the plurality of inverters 835. For each of the inverters 835:
 a respective one of the first-inverter-input-ferrites 841 is connected in series between the first-inverter-input-terminal 836 and a first node 845;
 a respective one of the DC-input-ferrites 843 is connected in series between the first node 845 and the DC-input-terminal 833;
 a respective one of the second-inverter-input-ferrites 842 is connected in series between the second-inverter-input-terminal 837 and a second node 846;
 a respective one of the reference-input-ferrites 844 is connected in series between the second node 846 and an anode of a respective one of the diodes 838;
 a cathode of the respective one of the diodes 838 is connected to the reference-terminal 834; and
 a respective one of the capacitors 839 is connected between the first node 845 and the second node 846.

The circuit of FIG. 8 provides a capacitive/inductive smoothing circuit that assists with producing a common DC rail, from a hydrogen fuel cell DC supply, that is suitable for providing to a plurality of inverters in an inverter array. This can be especially beneficial because it can allow commercially available solar inverters, which require a relatively low power independent DC input per inverter, to be used with a fuel cell with a single high power DC output.

Figure 9:
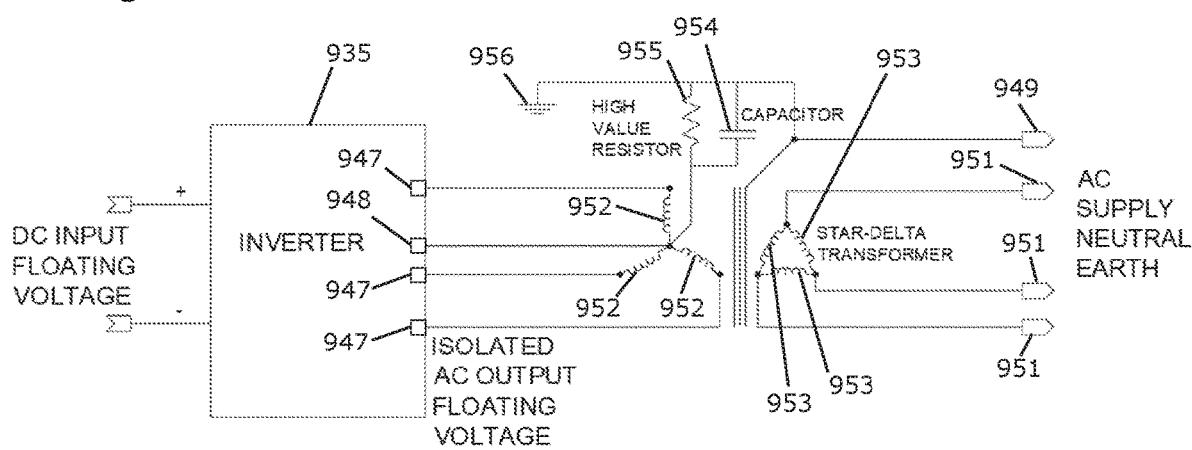
FIG. 9 shows a circuit for providing galvanic isolation between AC components and a high voltage DC fuel cell supply in a power generation system.

FIG. 9 shows a circuit for a power generation system.

The operation of most commercially available fuel cells requires a 'floating circuit' that is isolated from ground for the safety and reliability of the system, and to prevent irreparable damage to the fuel cell in the event of an insulation loss/failure. However, most UK electrical distribution systems are grounded at the neutral terminal to prevent the chassis from becoming permanently live in a typical overload protected circuit. Therefore, galvanic isolation between the AC component and the high voltage DC fuel cell supply is necessary for fuel cell operation.

The circuit of FIG. 9 includes an earth-output-terminal 949 and three live-output-terminals 951, one for each phase of a three phase AC supply. The circuit also includes a ground-terminal 956.

The circuit also includes an inverter 935 that converts a DC voltage provided by fuel cell into an inverter-AC-voltage. The inverter 935 includes an inverter-neutral-output-terminal 948 and three inverter-live-output-terminals 947.

FIG. 9 includes a galvanic-isolation-circuit, which comprises an isolation-transformer. In this example the isolation-transformer is a star-delta transformer, which includes: three primary windings 952, each connected between a respective one of the three inverter-live-output-terminals 947 and the inverter-neutral-output-terminal 948; and three secondary windings 953, each connected between a different pair of the three live-output-terminals 951. The galvanic-isolation-circuit also provides a galvanic connection between the earth-output-terminal 949 and the ground-terminal 956.

The galvanic-isolation-circuit further includes an isolation-resistor 955 and an isolation-capacitor 954 that are connected in parallel with each other between the inverter-neutral-output-terminal 948 and the ground-terminal 956. The isolation-resistor 955 and the isolation-capacitor 954 provide a high impedance connection to ground for the inverter and the associated fuel cell. The values of the isolation-resistor 955 and the isolation-capacitor 954 are such that current to ground for a given operating voltage is below a current-threshold. In this way, advantageously the current to ground would always be significantly below a level that would cause human discomfort, but is low enough to ensure the common mode voltage of the galvanically isolated fuel cell circuit remains within known sensible constraints.

The values of the isolation-capacitor 954 and the isolation-resistor 955 are tuned to match the interference characteristics of the attached inverters. Example values for the isolation-capacitor 954 are at least 10 nF, 50 nF, 100 nF and 200 nF. Example values for the isolation-resistor 955 are 1 MΩ 3 MΩ, 4.7 MΩ, 5 MΩ and 10 MΩ.

Electrical Systems

Figure 10:
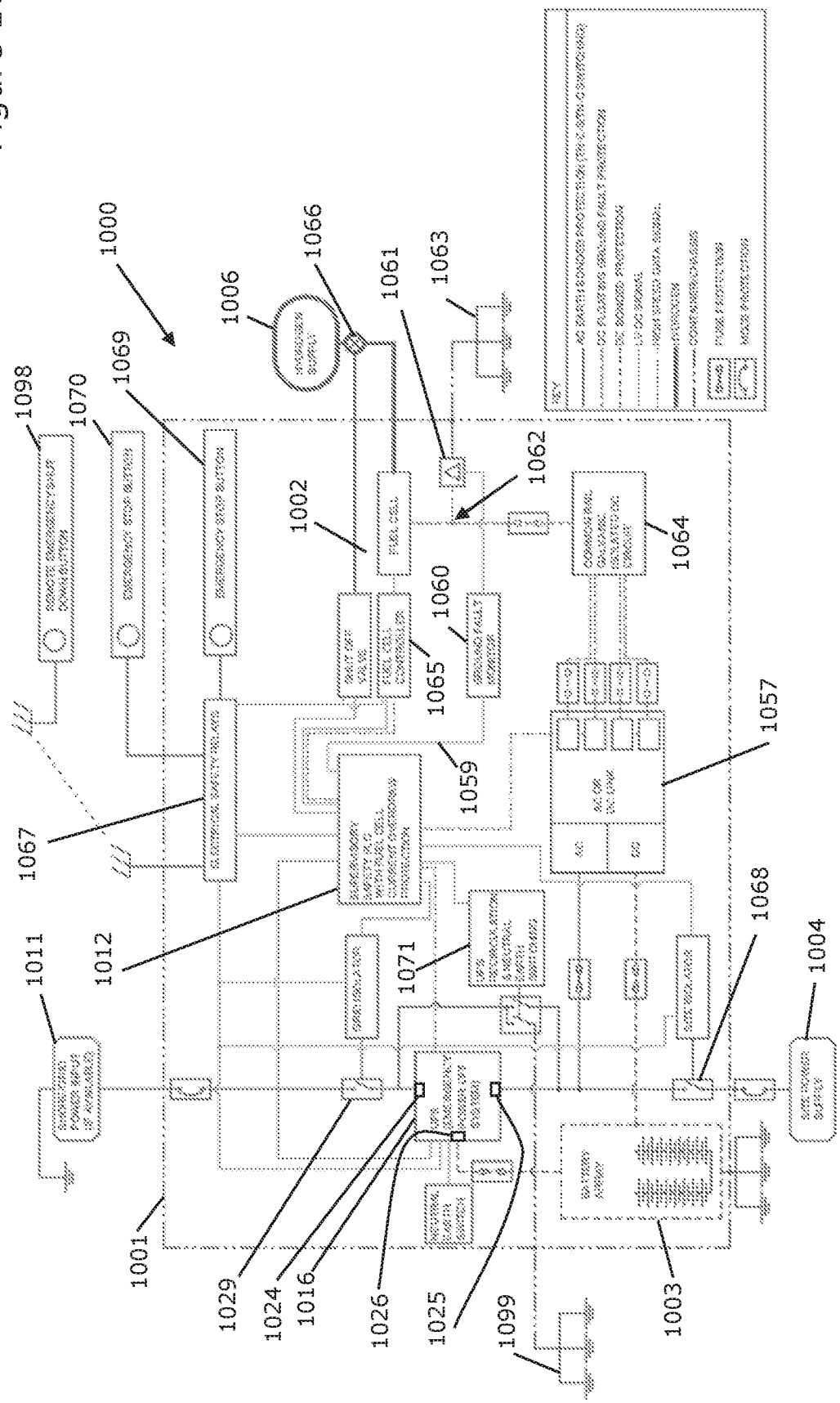
FIG. 10 shows another example of a power generation system.

FIG. 10 shows an example of a power generation system 1000. Features of FIG. 10 that have been described with reference to an earlier drawing (especially FIGS. 2 and 6) have been given corresponding reference numbers in the 1000 series.

The power generation system 1000 includes a power outlet 1004, a fuel cell 1002 and a UPS 1016. The fuel cell 1002 is configured to selectively provide power for the power outlet 1004 in the same way as described above. For instance, the fuel cell 1002 can directly provide power to the power outlet 1004 or it can indirectly provide power to the power outlet 1004 by charging a battery 1003, which in turn provides power to the power outlet 1004.

The power generation system 1000 also includes a galvanic-isolation-circuit 1057 that can transfer power between the fuel cell 1002 and the power outlet 1004. As above, this transfer of power can be indirect via a battery 1003 in some examples. The galvanic-isolation-circuit 1057 can also provide galvanic isolation between the fuel cell 1002 and the power outlet 1004. As discussed above, this galvanic isolation is required for fuel cell operation and can provide significant equipment and reliability advantages along with safety advantages when combined with a ground fault monitoring system.

In FIG. 2, the functionality of the galvanic-isolation-circuit 1057 is provided by a multi transformer galvanic isolation block 258 (which is shown in more detail in FIG. 9). In addition, the galvanic-isolation-circuit 1057, as it is shown in FIG. 10, provides the functionality of the inverter array 214 of FIG. 2. For this reason, the galvanic-isolation-circuit 1057 in FIG. 10 can be considered as providing an AC link between the fuel cell 1002 and the power outlet 1004.

In FIG. 6, the functionality of the galvanic-isolation-circuit 1057 is provided by a DC-DC galvanic isolated coupling array 631. The galvanic-isolation-circuit 1057 in FIG. 10 can therefore also, or instead, be considered as providing a DC link between the fuel cell 1002 and the battery 1003.

Returning to FIG. 10, the power generation circuit 1000 includes a controller 1012 that receives a resistance-signal 1059 that represents the resistance between a power-transfer-node 1062 and earth 1063. The power-transfer-node 1062 is a node in the power transfer path (in this example the DC power transfer path) between, and including, the fuel cell 1002 and the isolation-circuit 1057. In this example the power-transfer-node 1062 is between the fuel cell 1002 and a common rail galvanic isolated DC circuit 1064 (which can be implemented as the circuit of FIG. 8 in some examples).

In FIG. 10, the resistance-signal 1059 is provided by a ground fault relay or ohmmeter 1061 that is connected between the power-transfer-node 1062 and earth 1063. In this example, a ground fault monitor 1060 is connected between the ohmmeter 1061 and the controller 1012 in order to perform any optional processing on the resistance-signal 1059 that is provided by the ohmmeter 1062 before it is provided to the controller 1012.

If the received resistance-signal 1059 is less than a value where currents could flow to ground that would be injurious to human health, typically a resistance-threshold, then the controller 1012 performs one or more safety-operations. Non-limiting examples of suitable resistance-thresholds include a range of 5,000 to 275,000 ohms, such as 5,000 ohms, 10,000 ohms, 50,000 ohms, 100,000 ohms, 275,000 ohms, or 300,000 ohms. It has been found that if the resistance between the power-transfer-node 1062 and earth 1063 drops below a certain level then there is most likely an undesirable path to ground. This should not be the case if the power generation system 1000 is working correctly because this part of the system (the power transfer path between, and including, the fuel cell 1002 and the isolation-circuit 1057) should be floating. By monitoring the resistance-signal 1059 in this way, the equipment of the power generation system 1000 can be protected, and personnel can be protected from electrical shock.

The one or more safety-operations can include:
  shutting down the fuel cell and/or isolating the inverters. This safety-operation can be performed by the fuel cell controller 1065 in FIG. 10, which can be considered as part of the controller, even though it is shown separately from the PLC controller 1012 in FIG. 10.
  ceasing supply of hydrogen fuel to the fuel cell 1002. This safety-operation can include the controller (in this example the PLC controller 1012) closing a shut-off valve 1066 that is in a fuel flow path between a hydrogen supply 1006 and the fuel cell 1002. This safety-operation can also be implemented by a relay 1067 (which can be considered as providing part of the functionality of the controller more generally) closing a shut-off valve 1066. The relay 1067 will be described in more detail below. The shut-off valve 1066 can advantageously be implemented as a normally closed valve. This provides a safety advantage in that the fuel supply is cut off if the shut-off valve 1066 is unpowered.

disconnecting the fuel cell 1002 from the galvanic-isolation-circuit 1057 and/or from the power outlet 1004. This safety-operation can include the controller (either the PLC controller 1012 or the relay 1067) opening one or more fuel-cell-isolation-switches (not shown) within the galvanic-isolation-circuit 1057.

isolating the power outlet 1004 such that it does not receive power from the power generation system 1000. This safety-operation can include the controller (either the PLC controller 1012 or the relay 1067) opening a power-outlet-isolation-switch 1068 for disconnecting the power outlet 1004 from the UPS 1016 and/or the fuel cell 1002.

disconnecting the UPS 1016 from the power outlet 1016, which again can be implemented by the controller opening the power-outlet-isolation-switch 1068 for the embodiment of FIG. 10.

increasing the speed of a fan (such as the fan 1172, 172 that will be described below with reference to FIGS. 11 and 1) that causes air to be drawn through a fuel cell compartment 1108 and exit the container/power generation system through an outflow vent.

In the example of FIG. 10, the power generation system 1000 also includes a grid-supply-connector 1011 for receiving a grid supply voltage in the same way as described above. In which case, the one or more safety-operations can include isolating the grid-supply-connector 1011 such that it does not provide power to the power generation system 1000. This safety-operation can include the controller (either the PLC controller 1012 or the relay 1067) opening a grid-isolation-switch 1029 for disconnecting the grid-supply-connector 1011 from the UPS 1016.

If the received resistance-signal 1059 returns to being greater than a reconnect-resistance-threshold, after being less than the resistance-threshold, then the controller can perform one or more reconnection-operations. It will be appreciated that the reconnect-resistance-threshold can be greater than the resistance-threshold in order to provide some hysteresis in its operation. As will be discussed below, performing one or more reconnection-operations can enable the controller to put the power generation system back into a full working mode of operation after the fault that caused the resistance to drop has been removed.

The one or more reconnection-operations can include:

restarting the fuel cell 1002.

recommencing supply of hydrogen fuel to the fuel cell 1002, for instance by opening the shut-off valve 1066.

reconnecting the fuel cell 1002 to the galvanic-isolation-circuit 1067, for instance by closing one or more fuel-cell-isolation-switches (not shown) within the galvanic-isolation-circuit 1057.

reconnecting the fuel cell 1002 to the power outlet 1004, for instance by closing the fuel-cell-isolation-switch within the galvanic-isolation-circuit 1057;

reconnecting the power outlet 1004 such that it does receive power from the power generation system 1000, for instance by closing the power-outlet-isolation-switch 1068.

reconnecting the UPS 1016 to the power outlet 1004, for instance by closing the power-outlet-isolation-switch 1068.

reconnecting the grid-supply-connector 1011 such that it does provide power to the power generation system 1000, for instance by closing the grid-isolation-switch 1029.

In this way, AC site loads can be provided by MCCB (moulded case circuit breaker) over-current protection and neutral earth bonding to prevent electric shock. The fuel cell electrical connection is a floating non-grounded type where insulation to ground can be constantly monitored for a fault. A ground fault in this circuit can cause the controller to perform a controlled shutdown of the fuel cell and to remove the load to protect equipment and personnel from electrical shock. This can include neutral earth switching, as shown schematically in FIG. 10 with reference 1071, where a local neutral earth is established at the point of switching from grid to island power. This corresponds to the functionality that is described above with reference to FIG. 7.

A controlled shutdown can include the controller sending a signal to shutdown the fuel cell, while the hydrogen fuel supply and fuel cell power supply is maintained. This can be in contrast to an emergency shutdown where the power output and power supply of the fuel cell is isolated immediately, and the hydrogen fuel supply is isolated at an external valve. This can be damaging to the fuel cell, and so may only be implemented as part of a potentially very serious safety-operation.

We will now describe an aspect of the power generation system 1000 of FIG. 10 that relates to receiving and responding to an alarm-trigger-signal more generally (the resistance-signal that is described above is one example of an alarm-trigger-signal) such that equipment and personnel can be protected.

One or more of the following features of the power generation system 1000 can be particularly for this aspect: the power outlet 1004; the fuel cell 1002 that is configured to selectively provide power for the power outlet 1004; the battery 1003 that is configured to selectively provide power for the power outlet 1004; the grid-supply-connector 1011 for receiving a grid supply voltage; and the UPS 1016. In the same way that is described above, the UPS 1016 has: a grid-input terminal 1024 connected to the grid-supply-connector 1011; a power-output-terminal 1025 connected to the power outlet 1004; and a battery-connection-terminal 1026 connected to the battery 1003. Also, at least the fuel cell 1002, the battery 1003 and the UPS 1016 are housed within a shipping container 1001.

The controller of FIG. 10 (which can be the PLC 1012, the fuel cell controller 1065 and/or the relay 1067) is configured to perform one or more safety-operations in response to receiving an alarm-trigger-signal.

Examples of safety-operations that can be performed by the controller include:

providing a fuel-cell-power-control-signal for reducing the power that is provided by the fuel cell 1002 and shutting down the fuel cell in a controlled way.

causing the shut-off valve 1066 to cease supply of hydrogen fuel to the fuel cell and within the container 1002.

disconnecting the fuel cell 1002 from the galvanic-isolation-circuit 1057, which can be achieved by operating a fuel-cell-isolation-switch (which may be inside the block that is labelled as AC or DC link in FIG. 10).

disconnecting the fuel cell 1002 from the power outlet 1004, which can be achieved by operating a fuel-cell-isolation-switch in order to disconnect the fuel cell 1002 from the power outlet 1004.

disconnecting the power outlet 1004 from the UPS 1016 and/or the fuel cell 1002, which can be achieved by operating a power-outlet-isolation-switch 1068 such that the power outlet 1004 does not receive power from the power generation system 1000.

disconnecting the grid-supply-connector 1011 from the UPS 1016, which can be achieved by operating a grid-isolation-switch 1029 such that the UPS 1016 does not receive power from the grid-supply-connector 1011.

As indicated above, the controller can include one or more relays 1067 that are configured to perform one or more of the safety-operations. The one or more relays 1067 can be considered as electrical safety relays, and can be hard-wired to one or more actuators that are configured to implement safety-operations. In the example of FIG. 10, the one or more actuators include: the shut-off valve 1066; the fuel-cell-isolation-switch (not shown); the power-outlet-isolation-switch 1068; and the grid-isolation-switch 1029. The one or more relays 1067 can be used to implement safety-critical safety-operations, including those that are especially important for maintaining the safety of personnel.

The power generation system 1000 of FIG. 10 includes a manually operable user interface, which a user can operate to provide the alarm-trigger-signal to the controller. The user interface of FIG. 10 includes an emergency stop button 1069 that is local to the power generation system 1000 (for instance inside a shipping container 1001). The user interface of FIG. 10 also includes an emergency stop button 1070 that is remote from the power generation system 1000 (for instance outside the shipping container 1001). As a further example, the user interface can wirelessly provide the alarm-trigger-signal to the controller, for instance in response to a user activating a remote emergency shut down button 1098. Such a remote emergency shut down button 1098 can be provided on a computing device, including a portable computing device such as a smart phone, a tablet computer or a laptop computer.

As a further example, a sensor can provide the alarm-trigger-signal. Optionally, the sensor can provide the alarm-trigger-signal to the one or more relays 1067, especially where the sensors are providing safety critical information. Examples of suitable sensors include:

a smoke sensor/alarm associated with the power generation system 1000 (optionally inside the shipping container 1001);

a heat sensor/alarm associated with the power generation system 1000 (optionally inside the shipping container 1001); and a gas sensor/alarm associated with the power generation system 1000 (optionally inside the shipping container 1001).

As an additional example, an airflow sensor for sensing airflow in the fuel cell compartment or battery compartment of the power generation system. The airflow sensor can generate an alarm-trigger-signal if the airflow is considered potentially insufficient to reliably remove any leaked hydrogen. The airflow sensor can directly measure airflow, or it can measure air pressure which (due to a differential with ambient air pressure outside the container) can be another way of representing airflow. As a further still example, the airflow sensor can measure an operational parameter of a fan that is used to create the airflow through the fuel cell compartment, as will be discussed in more detail below.

In some examples, the controller (in this example the PLC controller 1012) receives one or more system-parameters (example of which are the fuel-cell-parameters that are described above) that represent one or more operating parameters of the power generation system 1000. The controller can then generate the alarm-trigger-signal based on the one or more system-parameters.

In this way, an electrical safety system can be implemented as a three-way protection system:

Manually activated via emergency stop buttons 1069, 1070, 1098;

Automatically activated hardwired supervisory relays with signals from:
  Gas detection alarms; and
  Smoke and heat detectors; and Automatically activated via programmable logic controller (PLC) 1012 and software.

This can result in immediate shutdown of the system in an emergency.

An emergency stop button press or critical fire or gas detection can result in:

Disconnection of the grid supply;
Disconnection of the site supply;
Shutting down of the fuel cell; and
All gas shutdown emergency procedures that are disclosed herein.

Also, system parameters can be monitored by the PLC 1012 that result in controlled stopping of the power generation system 1000 when parameters exceed set limits to protect personnel and equipment.

Gas Safety Systems

Figure 11:
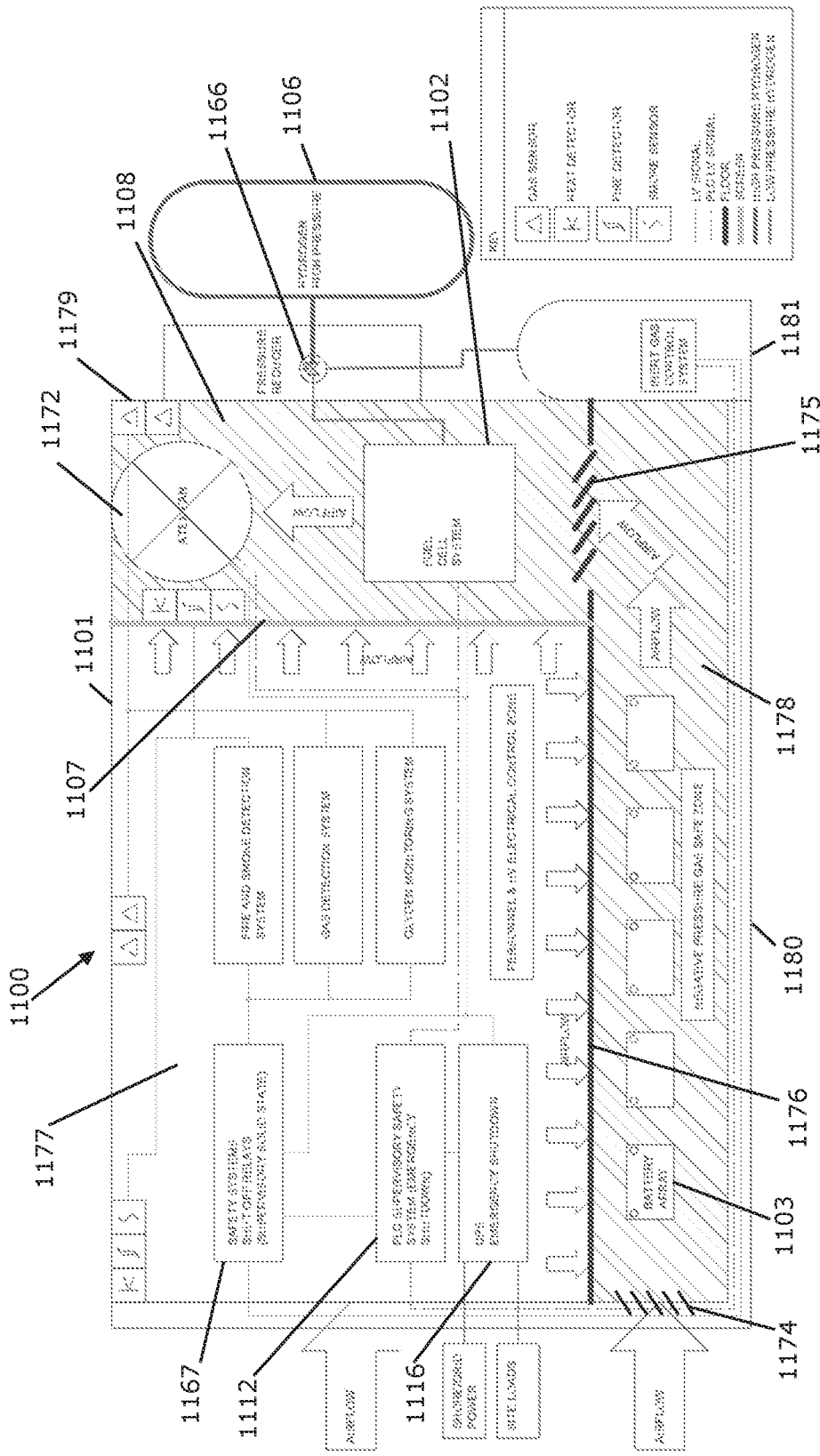
FIG. 11 shows a cross-sectional view of another example of a power generation system.

FIG. 11 shows a cross-sectional view of another example of a power generation system 1100. Features of FIG. 11 that have been described with reference to an earlier drawing have been given corresponding reference numbers in the 1100 series. The power generation system 1100 of FIG. 11 will be used to describe aspects of various gas safety systems.

The power generation system 1100 includes a container 1101, in this example a shipping container 1101, which has an interior volume. The interior volume is sub-divided into three compartments: i) a fuel cell compartment 1108; ii) a battery compartment 1178 (also shown in FIG. 1 with reference 178); and iii) a control compartment 1177 (also shown in FIG. 1 with reference 177).

A fuel cell 1102 is located within the fuel cell compartment 1108. The fuel cell compartment 1108 is a portion of the interior volume of the container 1101 that is defined by one or more fuel-cell-partitions in the container. In this example the one or more fuel-cell-partitions includes an internal-wall-partition 1107 that is generally parallel with, and spaced apart from, a side wall 1179 of the container 1101. In this way, the fuel cell compartment 1108 is a plenum that is defined between the internal-wall-partition 1107 and the side wall 1179 of the container 1101.

A battery 1103 (in this example a battery array) is located within the battery compartment 1178. The battery compartment 1178 is a portion of the interior volume of the container 1101 that is defined by one or more battery-partitions. In this example the one or more battery-partitions includes a raised-floor-battery-partition 1176 that is generally parallel with, and spaced apart from, a bottom wall 1180 of the container 1101. In this way, the battery compartment 1178 is a plenum that is defined between the raised-floor-battery-partition 1176 and the bottom wall 1180 (floor) of the container 1101. (The raised-floor-battery-partition is also shown in FIG. 1 with reference 176.)

FIG. 11 also shows an internal-partition 1175 that partially defines the fuel cell compartment 1108 and also partially defines the battery compartment 1178. The internal-partition 1175 is in the same plane as the raised-floor-battery-partition 1176. The raised-floor-battery-partition 1176 extends from a side wall of the container 1101 to an edge where it meets the internal-wall-partition 1107. The internal-wall-partition 1107 extends from the ceiling of the container 1101 to an edge where it meets the raised-floor-battery-partition 1176. The raised-floor-battery-partition 1176 is in a plane that is perpendicular to the internal-wall-partition 1107. The edge where the raised-floor-battery-partition 1176 and the internal-wall-partition 1107 meet is in an axis that is spaced apart from the parallel external walls of the container 1101. The internal-partition 1175 extends from the edge where the raised-floor-battery-partition 1176 and the internal-wall-partition 1107 meet to an external wall 1179 of the container 1101. In FIG. 11 there is an internal vent in the internal-partition 1175 such that air can flow freely between the battery compartment 1178 and the fuel cell compartment 1108.

The control compartment is a portion of the interior volume of the container 1101 that is: separated from the fuel cell compartment 1108 by the one or more fuel-cell-partitions 1107; and separated from the battery compartment 1178 by the one or more battery-partitions 1176. The control compartment 1177 houses one or more of: a UPS 1116; a controller (which can be implemented as a PLC 1112 and/or one or more relays 1167); one or more switches, a galvanic-isolation-circuit (not shown in FIG. 11, but described extensively above); an inverter (not shown in FIG. 11, but described extensively above); a smoke sensor/alarm; a heat sensor/alarm; a gas sensor/alarm; an oxygen monitoring system; and any other features of other examples of power generation systems disclosed herein. The control compartment 1177 can include potential sources of ignition that should be kept away from any potential hydrogen leaks for safety reasons.

The power generation system 1100 of FIG. 11 includes a fan 1172 that reduces the air pressure in the fuel cell compartment 1108 such that air is drawn through the battery compartment 1178 and the fuel cell compartment 1108 and exits the container through an outflow vent. This advantageously vents any leaked hydrogen to atmosphere through the outflow vent, and also provides cooling for the batteries in the battery compartment 1178. The outflow vent is not visible in FIG. 11, although FIG. 1 shows how the fan 172 is adjacent to an external wall of the container 101 (the back wall in FIG. 1). It will be appreciated that there is an opening (outflow vent) in the external wall of the container 101 such that the fan 172 moves air from within the fuel cell compartment 108 to the outside of the container 101 through the opening, such that the air pressure in the fuel cell compartment 108 is reduce to below ambient air pressure. In the example of FIGS. 1 and 11, the outflow vent is in an external wall of the container 101, 1101 that also defines a wall of the fuel cell compartment 108, 1108. In this way the fan 172, 1172 can blow air out of the container 101, 1101 through the outflow vent, thereby reducing the air pressure in the fuel cell compartment 108, 1108 and the battery compartment 1178.

Returning to FIG. 11, the power generation system 1100 in this example also includes an inflow vent 1174 in an external wall of the container (in FIG. 11 in the left wall of the container 1101). The fan 1172 draws air into the battery compartment 1178 and the fuel cell compartment 1108 from outside the container 1101 through the inflow vent 1174. In FIG. 11, the inflow vent 1174 is in an external wall of the container 1101 that also defines the battery compartment 1178. The inflow vent 1174 is at an opposite end of the container 1101 to the fuel cell compartment (and the internal vent in the internal-partition 1175) such that air that is drawn into the battery cell compartment 1178 through the inflow vent 1174 has to travel the length of the battery compartment 1178 before exiting the battery compartment 1178 through the internal vent.

As shown schematically in FIG. 11 by various airflow arrows, the raised-floor-battery-partition 1176 does not need to provide a strictly gas-tight barrier between the battery compartment 1187 and the control compartment 1177. Similarly, the internal-wall-partition 1107 does not need to provide a gas-tight barrier between the fuel cell compartment 1108 and the control compartment 1177. The raised-floor-battery-partition 1176 should be sufficiently gas-tight such that the fan 1175 can maintain a sufficient air pressure differential between the battery compartment 1178 and the control compartment 1177, so that sufficient air flows over the battery 1103 for cooling purposes.

Similarly, the internal-wall-partition 1107 should be sufficiently gas-tight such that the fan 1175 can maintain a sufficient air pressure differential between the fuel cell compartment 1108 and the control compartment 1177, to ensure that any leaked hydrogen from the fuel cell 1102 does not move into the control compartment 1177, and also so there is sufficient air flow through the fuel cell compartment 1108 to promptly remove any leaked hydrogen.

The outflow vent in this example is in an upper region of an external wall that defines a wall of the fuel cell compartment 1108, and optionally proximal to the ceiling of the container 1101, which assist with the removal of any leaked hydrogen because it is less dense than air and therefore will rise to the top of the fuel cell compartment 1108.

In this way, the fuel cell 1102 and the battery 1103 are positioned in a negative pressure gas safe zone (negative with respect to ambient atmosphere and the control compartment 1177), where an airflow path is carefully managed through strategically placed and sized external outflow vents, ensuring that any accidental hydrogen release by the fuel cell 1002 or battery 1003 is vented safely to atmosphere without encountering any source of ignition along its path. Any such potential sources of ignition can be present in the control compartment 1177.

In this example, the fan 1172 can be implemented as a single ATEX fan to create the airflow, which is monitored continuously such that any loss of power causes the fuel cell 1102 to safely shutdown (as described above with reference to an alarm-trigger-signal that is provided by an airflow sensor).

Another aspect of the power generation system 1100 that is illustrated in Figure relates to the positioning and operation of a hydrogen flow control valve 1166 (which may or may not be the same as the shut-off valve that is described above).

As described above, the fuel cell 1102 is located within the container 1101. Also, a hydrogen supply 1106 is located outside the container 1101. The hydrogen flow control valve 1166 is also outside the container 1101, and is in a conduit between the hydrogen supply 1106 and the fuel cell 1102. In this example the hydrogen flow control valve 1166 is located in a high-pressure hydrogen panel that is affixed to an outer surface of the container 1101. The hydrogen flow control valve 1166 can be used to reduce the pressure of high-pressure hydrogen from the hydrogen supply 1106 before it is provided into the fuel cell 1102.

The power generation system 1100 also includes an inert gas control system 1181 that is configured to operate the hydrogen flow control valve 1166. The hydrogen flow control valve 1166 (or valves if there is more than one) are triggered using an inert gas such that no source of ignition within the high-pressure hydrogen panel exists.

In this way a high-pressure hydrogen supply is connected externally and the hydrogen is reduced in pressure before entering the container 1101, therefore reducing the risk of an explosive atmosphere developing within the container 1101.

The system of FIG. 11 further includes an external series of solenoid valves (not shown) that are configured to operate the inert gas control system 1181 based on control signals received from a controller (such as the PLC 1112) or other safety/control systems. This can advantageously enable an automated electronically triggered gas shutoff to be performed, without a risk of any sources of ignition in the vicinity of any hydrogen (especially high-pressure hydrogen).

Beneficially, in this example the hydrogen flow control valve 1166 is a normally closed valve. In this way, the valves are normally closed in a de-energised state such that the removal of all power in an emergency or fault situation will eliminate any source of ignition and the gas supply.

FIG. 12a shows a longitudinal cross-sectional view of another example of a power generation system 1200. FIG. 12b shows a lateral cross-sectional view of the power generation system 1200, through the fuel cell compartment 1208. Features of FIGS. 12a and 12b that have been described with reference to an earlier drawing have been given corresponding reference numbers in the 1200 series.

In a similar way to the example of FIG. 11, the power generation system 1200 includes a container 1201, in this example a standard shipping container. The container 1201 has a footprint, the longitudinal aspect of which is labelled in FIG. 12a with reference 1283. The lateral aspect of the footprint is labelled with reference 1284 in FIG. 12b. The power generation system 1200 includes a control compartment 1277, which is a portion of an interior volume of the container 1201.

The power generation system 1200 also includes a fuel cell compartment 1208, which is within the footprint of the container 1201. A fuel cell 1202 is located within the fuel cell compartment 1208. The fuel cell compartment 1208 is separated from the control compartment 1277 by one or more gas-tight fuel-cell-partitions 1207, which can be considered as defining a gas-tight bulkhead between the control compartment 1277 (which, as discussed above can potentially include a source of ignition) and the fuel cell compartment 1208.

The power generation system 1200 further includes a battery compartment 1278, which is a portion of the interior volume of the container 1201 that is defined by one or more battery-partitions 1276. A battery is located within the battery compartment 1278). The one or more battery-partitions 1276 can the same as those described with reference to FIG. 11.

In this example, a fan 1272 is configured to draw air into the fuel cell compartment 1208 from the battery compartment 1278. In this way, the fan 1272 can reduce the pressure in the battery compartment. Furthermore, the fuel cell compartment 1208 is open to atmosphere in this example. For instance, as shown in FIG. 12a, an external wall of the container 1201 (the right-most wall in FIG. 12a) can include a sufficient number of louvres or vents such that there is no significant air pressure drop across it. Therefore, as the fan 1272 draws air into the fuel cell compartment 1208 it is immediately exposed to atmosphere. In some examples, an external wall of the container 1201, or a portion of an external wall of the container 1201, can be completely removed such that the fuel cell compartment 1208 is completely open to atmosphere.

In this way, the fan 1272 can provide an air flow through the battery compartment 1278 in order to assist with cooling of the batteries, and it can also encourage air flow out of the fuel cell compartment 1208. As discussed above, this provides the advantage that, in the unlikely event that there is a hydrogen leak in the fuel cell compartment 1208, the hydrogen is vented to atmosphere without being exposed to any potential source of ignition in the control compartment 1277. The control compartment 1277 can include any of the components that are described above with reference to FIG. 11.

Figure 12:
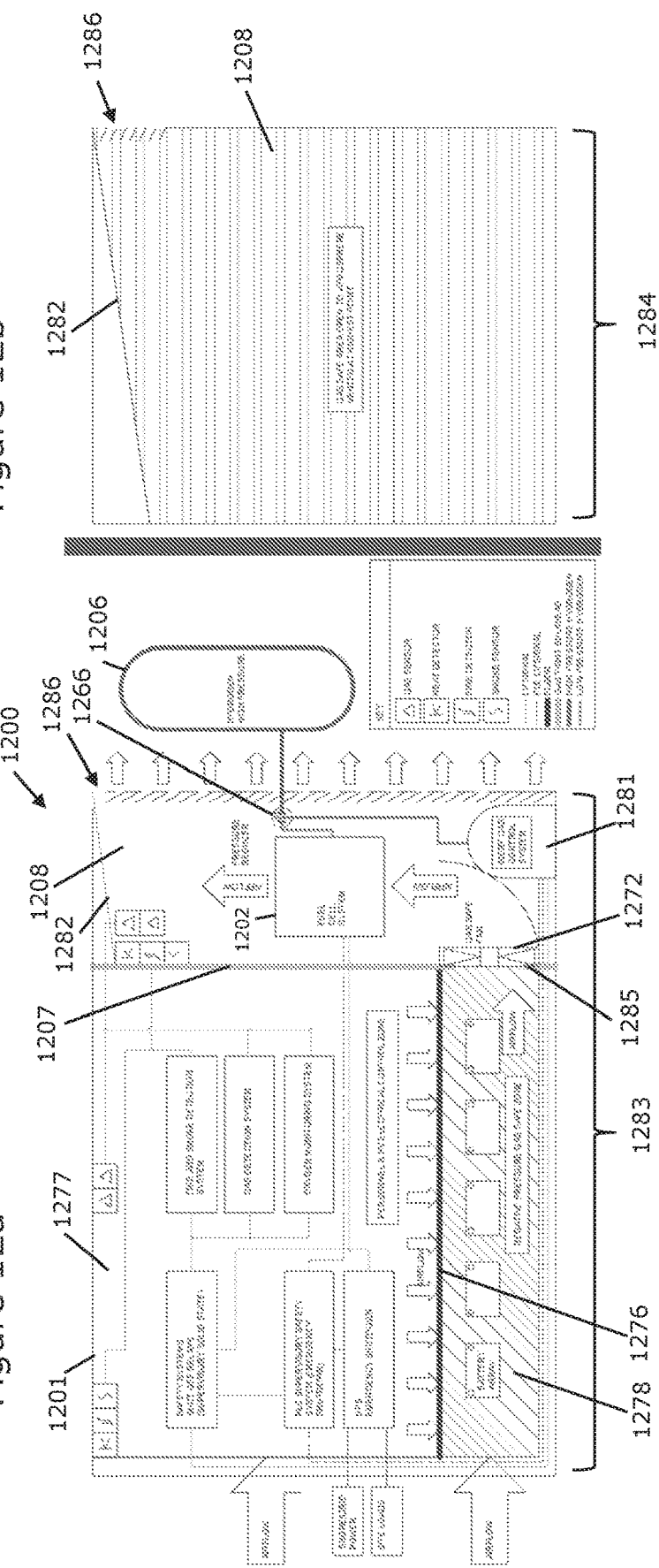
FIG. 12a shows a longitudinal cross-sectional view of another example of a power generation system.
FIG. 12b shows a lateral cross-sectional view of the power generation system of FIG. 12a, through the fuel cell compartment.

In the example of FIG. 12, the power generation system 1200 also includes an internal-partition 1285 that partially defines the fuel cell compartment 1208 and also partially defines the battery compartment 1278. The fan 1272 is located in the internal-partition 1285. In this implementation, the internal-partition 1285 is in the same plane as one of the gas-tight fuel-cell-partitions 1207, although it will be appreciated that the power generation system 1200 can be configured differently while still achieving the desired airflow.

Irrespective of how open to atmosphere the fuel cell compartment 1208 is, there can be an outflow vent 1286 in an external wall of the container 1207 that defines the fuel cell compartment 1208. In this example, the outflow vent 1286 extends around the corner of two perpendicular walls of the container 1201, as shown in FIGS. 12a and 12b.

Advantageously, the outflow vent 1286 is at an uppermost region of the fuel cell compartment 1201. Since hydrogen is lighter than air, this assists with exhausting any hydrogen in the fuel cell compartment 1208. Further still, in this example, the power generation system 1200 further includes a cowl/ceiling 1282 within the fuel cell compartment 1208 that is angled such that it defines a surface that extends upwards towards the outflow vent 1286. The cowl/ceiling 1282 need not necessarily be planar, as it is shown in FIGS. 12a and 12b. For example, the cowl/ceiling 1282 can define a curve in either or both of the lateral and longitudinal dimensions, and the curve can be expressed mathematically such that it does not have any turning points. That is, the cowl/ceiling 1282 can define a surface that extends upwards towards the outflow vent 1286 from any position on the surface. In this way, there are no indentations or pockets in the cowl/ceiling 1282 in which hydrogen can accumulate instead of being vented to atmosphere.

The shape of the cowl/ceiling 1282 can be is designed to create a passive vacuum which vents air in the fuel cell compartment 1208 to atmosphere and draws air through the battery compartment 1278.

The power generation system further comprises a hydrogen flow control valve 1266 that is in a conduit between a hydrogen supply 1206 and the fuel cell 1202. As above, the hydrogen flow control valve 1266 is for reducing the pressure of the hydrogen before it is provided to the fuel cell 1202. Again, as above, an inert gas control system 1281 is used to operate the hydrogen flow control valve 1266. In this example, however, the hydrogen flow control valve 1266 is within the footprint of the container 1201. It can be advantageous to have as many components as possible within the container in terms of being able to transport the container 1201 using existing methods, such as on the back of a lorry as a standard shipping container.

The power generation system 1201 can include an inflow vent in an external wall of the container in the same way as described above with reference to FIG. 11.

The one or more gas-tight fuel-cell-partitions 1207 in this example includes a gas-tight internal-wall-partition that is generally parallel with, and spaced apart from, a second side wall of the container, such that the control compartment 1277 is defined between the internal-wall-partition and the second side wall of the container.

In this way, the fuel cell compartment 1208 can be considered as a gas-safe zone (for example an ATEX zone) that is isolated from the control compartment 1277 via an internal gas tight bulkhead, which leaves the fuel cell 1202 open to ambient air. Furthermore, as indicated above, this allows the inert gas control system 1281 and the high-pressure valves 1266 to be brought inside the open-ended vented footprint of the modified container 1201.

Returning to FIG. 1, we will now describe how rupture panels 187 (which can also be described as emergency vent relief panels) can provide additional safety functionality for the power generation system 100.

As discussed above, the power generation system 100 includes a container (in this example a shipping container 101) having an interior volume. The power generation system also includes a fuel cell compartment 108, which is a portion of the interior volume that is defined by one or more fuel-cell-partitions 107 in the container 101. A fuel cell 102 is located within the fuel cell compartment 108. A battery compartment 178 is also provided, which is a portion of the interior volume that is defined by one or more battery-partitions 176. One or more batteries 103 are located within the battery compartment 178.

The power generation system 100 also includes a control compartment 177, which is a portion of the interior volume that is: separated from the fuel cell compartment 108 by the one or more fuel-cell-partitions 107; and separated from the battery compartment 178 by the one or more battery-partitions 176.

Furthermore, the power generation system includes one or more rupture panels 187 in an exterior wall or ceiling of the container 101. The rupture panels 187 are configured to be removable from respective frames in the exterior wall or ceiling of the container 101 in response to a rapid increase in air pressure within the container, for instance in the very unlikely event that there is an explosion in the container 101. In this way, the pressure within the container 101 can be more moderately relieved. The rupture panels 187 may be affixed to their respective frames by perforated attachment regions that are designed to rupture when a predefined pressure within the container 101 is exceeded.

In this example a plurality of rupture panels 187 are located in the ceiling/roof of the container 101, although in other examples there could be rupture panels in an exterior wall of the container 101. In the unlikely event of a gas explosion the internal pressure generated is vented through these sacrificial perforated rupture panels. These rupture panels 187 in the ceiling/roof release the pressure such that the walls of the container 101 remain intact and prevent damage to surrounding areas and/or personal injury to nearby operators.

In this example, there is at least one rupture panel located in an exterior wall or ceiling of the container 101 that defines the fuel cell compartment 108. There is also at least one rupture panel located in an exterior wall or ceiling of the container that defines the control compartment.

In some examples, the rupture panels 187 have one edge that is more securely affixed to the container 101 than other edges of the rupture panel 187. For instance, perforated regions along one of the edges of the rupture panel 187 may be designed such that they rupture at a higher pressure than the other edges. In this way, if the pressure within the container 101 increases sufficiently to blow the rupture panel 187, it will pivot about the more securely affixed edge and therefore will not be completely separated from the container 101. This is another safety advantage because it reduces the likelihood that the rupture panel 187 itself could cause damage to a person or equipment in the vicinity of the power generation system 100.

Heat Exchanger

Figure 13:
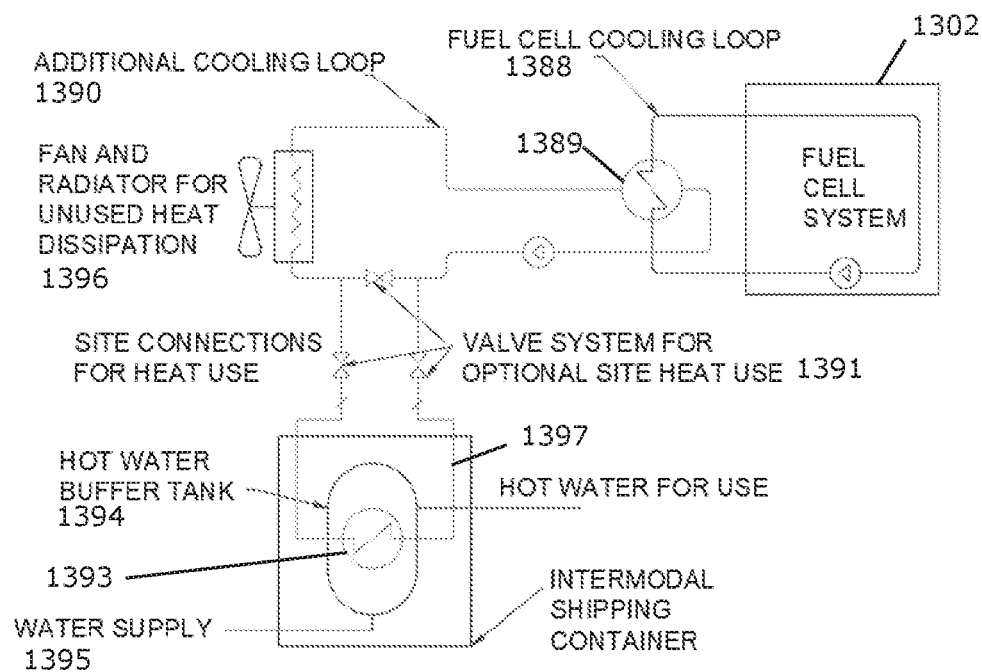
FIG. 13 shows schematically an example of a fuel cell cooling circuit.

With reference to FIGS. 1 and 13, we will now describe how a heat exchanger can advantageously use heat that is extracted from the fuel cell during cooling for a local application that requires heat. In the example of FIG. 1, the heat exchanger is located within a fuel cell heat exchanging cooling module 188 that is affixed to an exterior surface of the container 101; in this example the roof of the container 101. As indicated in FIG. 1, this fuel cell heat exchanging cooling module 188 can provide a hot water supply 1395. Advantageously, the fuel cell heat exchanging cooling module 188 can be removable from the container 101 to assist with transport of the container 101, especially when the container 101 is a standard sized shipping container.

FIG. 13 shows schematically an example of a fuel cell cooling circuit. The fuel cell system 1302 includes a fuel cell cooling loop 1388 for removing heat from the fuel cell 1302. The fuel cell can be air cooled or liquid cooled, and therefore the fuel cell cooling loop 1388 can transport a fluid, either a gas or a liquid, to remove heat from the fuel cell.

FIG. 13 also shows a heat exchanger 1389 for transferring heat from the fuel cell cooling loop 1388 such that it can be used to service a local application that requires heat. The local application can include one or more of: providing a hot water supply; providing space heating; and providing heating for one or more processes. The example that is illustrated in FIG. 13 relates to providing a hot water supply, although the skilled person will readily recognise that the heat that is extracted from the fuel cell cooling loop 1388 can be put to good use in numerous other ways.

In this example, FIG. 13 includes an additional cooling loop 1390 for receiving heat from the fuel cell cooling loop 1388 through the heat exchanger 1389. Furthermore, the additional cooling loop 1390 can selectively heat water in a water tank 1394 such that it can be provided as a hot water supply. In this example there are one or more valves in the additional cooling loop 1390 that are operable to selectively direct fluid in the additional cooling loop 1390 to heat the water in the water tank 1394. More particularly, there are two valves, which will be referred to as hot-water-tank-circuit valves 1391, that, when open, cause fluid in the additional cooling loop 1390 to enter a hot water tank circuit 1397. The hot water tank circuit 1397 includes another heat exchanger 1393 for heating the water in the hot water tank 1394. When the hot-water-tank-circuit valves 1391 are closed, fluid is not moved around the hot water tank circuit 1397. Therefore, the hot-water-tank-circuit valves 1391 can be operated to provide a hot water supply on demand.

FIG. 13 also shows a heat removal component 1396 that selectively transfers heat from the fluid within the additional cooling loop 1390 to atmosphere. In this example, the heat removal component 1396 includes a radiator and a fan to dissipate unused heat. In some examples, the heat removal component 1396 is automatically activated when the temperature of the fluid in the additional cooling loop 1390 exceeds a predetermined setpoint.

The invention claimed is:

1. A power generation system, comprising:
a grid-supply-connector for receiving a grid supply voltage;
a power outlet;
a battery that is configured to selectively provide power for the power outlet; and
an uninterruptable power supply, UPS, that has: a grid-input terminal, a power-output-terminal and a battery-connection-terminal, wherein:
the grid-input terminal is connected to the grid-supply-connector;
the power-output-terminal is connected to the power outlet; and
the battery-connection-terminal is connected to the battery;
the UPS is configured to apply a control algorithm in order to provide power to the power-output-terminal based on signals received at the grid-input terminal and the battery-connection-terminal;
a fuel cell that is configured to selectively provide power to the power outlet, independently of the UPS;
an inverter for converting a DC voltage that is provided by the fuel cell into an inverter-AC-voltage for providing to the power outlet; and
a controller that is configured to:
receive a system-load-signal that represents the amount of power that is required by an external load that is connected to the power outlet;
receive one or more fuel-cell-parameters that represent one or more operating parameters of the fuel cell; and
provide a fuel-cell-power-control-signal based on the system-load-signal and the one or more fuel-cell-parameters, wherein the fuel-cell-power-control-signal is for setting a control-parameter of the fuel cell and/or is for setting a control parameter of the inverter.

2. The power generation system of claim 1, wherein the controller is further configured to:
receive a battery-charge-signal that represents a level of charge of the battery; and
provide the fuel-cell-power-control-signal also based on the battery-charge-signal.

3. The power generation system of claim 1, wherein the controller is configured to:
determine a fuel-cell-target-value based on the system-load-signal and the battery-charge-signal, wherein the fuel-cell-target-value represents a target level for the fuel cell; and
set the fuel-cell-power-control-signal based on the fuel-cell-target-value.

4. The power generation system of claim 3, wherein the fuel cell is configured to provide power for the power outlet and also charge the battery.

5. The controller-power generation system of claim 3, wherein:
the received grid-supply-signal represents a power level of the grid supply; and
the controller is configured to determine the fuel-cell-target-level also based on the grid-supply-signal.

6. The power generation system of claim 1, wherein the controller is further configured to:
receive a grid-supply-characteristic-signal that represents a characteristic of the grid supply; and
provide the fuel-cell-power-control-signal also based on the grid-supply-characteristic-signal.

7. The power generation system of claim 6, wherein:
the grid-supply-characteristic-signal comprises a grid-supply-power-level that represents a power level of the grid supply; and
the controller is configured to:
determine a supply-threshold based on the system-load-signal;
compare the grid-supply-power-level with the supply-threshold; and
if the grid-supply-power-level is less than the supply-threshold, then set the fuel-cell-power-control-signal such that the fuel cell provides power for the power outlet; or
if the grid-supply-voltage-level is greater than or equal to the supply-threshold, then set the fuel-cell-power-control-signal such that the fuel cell does not provide power for the power outlet.

8. The power generation system of claim 7, wherein the controller is configured to:
determine a fuel-cell-target-current based on the difference between the grid-supply-power-level and the supply-threshold; and
if the grid-supply-power-level is less than the supply-threshold, then set the fuel-cell-power-control-signal based on the fuel-cell-target-current.

9. The power generation system of claim 1, wherein the fuel cell is configured to provide power to charge the battery.

10. The power generation system of claim 9, further comprising a DC-DC converter that is connected between the fuel cell and the battery.

11. A power generation system, comprising:
a power outlet;
a battery;
a grid-supply-connector for receiving a grid supply power; and
an uninterruptable power supply, UPS, that has: a grid-input terminal, a power-output-terminal and a battery-connection-terminal, wherein:
the grid-input terminal is connected to the grid-supply-connector;
the power-output-terminal is connected to the power outlet;
the battery-connection-terminal is connected to the battery; and
the UPS is configured to provide power that it receives at the grid-input terminal and/or the battery-connection-terminal to the power-output-terminal;
wherein the UPS is configured to provide power that it receives at the grid-input terminal to the battery-connection-terminal in order to charge the battery;
a fuel cell that is configured to provide power to charge the battery independently of the UPS.

12. The power generation system of claim 11, further comprising:
an inverter configured to convert a DC output voltage provided by the fuel cell into an inverter-AC-voltage, and wherein the inverter is configured to provide the inverter-AC-voltage to the power outlet.

* * * * *